United States Patent
Ishii et al.

(10) Patent No.: US 8,196,179 B2
(45) Date of Patent: Jun. 5, 2012

(54) STORAGE CONTROLLER FOR CONTROLLING ACCESS BASED ON LOCATION OF CONTROLLER

(75) Inventors: Yohsuke Ishii, Yokohama (JP); Shoji Kodama, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 1171 days.

(21) Appl. No.: 12/017,763

(22) Filed: Jan. 22, 2008

(65) Prior Publication Data

US 2009/0083837 A1    Mar. 26, 2009

(30) Foreign Application Priority Data

Sep. 26, 2007  (JP) .................................. 2007-249835

(51) Int. Cl.
  G06F 7/04  (2006.01)
  G06F 17/30 (2006.01)
(52) U.S. Cl. ............................................... 726/2; 726/4
(58) Field of Classification Search .................. None
  See application file for complete search history.

(56) References Cited

U.S. PATENT DOCUMENTS

| | | | |
|---|---|---|---|
| 6,308,273 B1 * | 10/2001 | Goertzel et al. | 726/9 |
| 6,745,207 B2 * | 6/2004 | Reuter et al. | 1/1 |
| 7,007,042 B2 * | 2/2006 | Lubbers et al. | 1/1 |
| 7,200,623 B2 * | 4/2007 | Chandrasekaran et al. | 1/1 |
| 7,269,612 B2 * | 9/2007 | Devarakonda et al. | 707/694 |
| 7,295,556 B2 * | 11/2007 | Roese et al. | 370/395.3 |
| 7,591,020 B2 * | 9/2009 | Kammer et al. | 726/26 |
| 2008/0163339 A1 * | 7/2008 | Janakiraman et al. | 726/2 |

FOREIGN PATENT DOCUMENTS

WO  2007/010724 A1  1/2007

* cited by examiner

*Primary Examiner* — William Power

(74) *Attorney, Agent, or Firm* — Brundidge & Stanger, P.C.

(57) ABSTRACT

Provided is a controller in a computer system, the computer system including a plurality of data storage systems, and at least one controller for controlling access to data stored in the plurality of data storage systems, the each controller including: an interface coupled to the network; a processor coupled to the interface; and a storage unit coupled to the processor, in which: the storage unit holds attribute information indicating whether to permit access to the data; and the processor is configured to: receive a writing request of the data from a client computer coupled to the network; judge whether each of the each controller permits the requested writing based on the held attribute information and information of a location where the each controller is installed; and write the data in a data storage system controlled by a controller judged to permit the writing.

15 Claims, 17 Drawing Sheets

| ITEM NAME | VALUE |
| --- | --- |
| (EXISTING METADATA) | ... |
| INFORMATION OF STORING PERMITTED LOCATION | JAPAN |
| INFORMATION OF STORING DENIED LOCATION | Null |
| INFORMATION OF ACCESS PERMITTED LOCATION | Null |
| INFORMATION OF ACCESS DENIED LOCATION | UNITED STATES |

*FIG. 6*

|  | 4310 | 4320 | 4330 | 4300 |
|--|--|--|--|--|

| ISP NAME | MANAGEMENT SERVER IDENTIFICATION INFORMATION OF ISP | COMMUNICATION CHARGE |
|---|---|---|
| ISP1 | 10.20.30.200 | 30 |
| ISP2 | 10.100.30.200 | 10 |
| ISP3 | 10.110.50.200 | 20 |
| ISP4 | 10.125.10.200 | 50 |
| ISP5 | 10.200.20.200 | 70 |

*FIG. 15*

|  | 4010 | 4020 | 4030 | 4000 |
|--|--|--|--|--|

| NODE NAME | IDENTIFICATION INFORMATION | NODE COMMUNICATION CHARGE |
|---|---|---|
| STORAGE NODE A | 10.20.30.40 | 30 |
| STORAGE NODE B | 10.100.30.40 | 10 |
| STORAGE NODE C | 10.110.50.60 | 20 |
| STORAGE NODE D | 10.125.10.10 | 50 |
| STORAGE NODE E | 10.200.20.20 | 70 |

*FIG. 16*

| | | |
|---|---|---|
| 4110 | NODE INSTALLATION LOCATION INFORMATION | JAPAN |
| | NODE INSTALLATION LOCATION INFORMATION | TOKYO |
| | ... | ... |
| 4130 | USED ISP INFORMATION | ISP2 |
| 4140 | MANAGEMENT SERVER IDENTIFICATION INFORMATION OF USED ISP | 10.100.30.200 |

STORAGE CONTROLLER FOR CONTROLLING ACCESS BASED ON LOCATION OF CONTROLLER

CLAIM OF PRIORITY

The present application claims priority from Japanese patent application JP 2007-249835 filed on Sep. 26, 2007, the content of which is hereby incorporated by reference into this application.

BACKGROUND

This invention relates to access control, and more particularly to data management and access control based on a storage permitted location and an access permitted location of data in a group of computer systems intercoupled via a network.

With higher performance and lower prices of computer systems, the use of the computer systems have recently been diffused in various industries and applications. Accordingly, data conventionally handled on paper media or the like have been computerized, and electronically stored by the computer system.

Additionally, a form where a plurality of computer systems are intercoupled via a network has rapidly progressed. Distributed management and distributed processing of data can be realized, and so availability, reliability, and performance which had been difficult to be realized only by one computer system has become possible.

In the form of intercoupling the plurality of computer systems via the network, it has become more important to provide a technology of efficiently managing data and a technology of controlling access for the purpose of improving convenience for computer system users.

An overlay network technology of building and providing a logical network structure by hiding a physical network structure for intercoupling a plurality of computer systems has recently been used. The overlay network technology enables transparent access to the computer system irrespective of an installation location of the computer system to be used.

By using the overlay network technology, for example, file share services of a peer-to-peer form for distributing and storing shared files can be realized on the computer systems which build the overlay network.

In the file share services, the users can know on which of the computer systems shared files are present by requesting file acquisition based on identification information of the shared files to be obtained. Once the presence location of the shared file is known, each user can obtain the shared file by accessing a relevant arbitrary computer system.

In the case of accessing the arbitrary computer system, the user doesn't have to know where the computer system to be accessed is actually present but has to know only identification information of the computer system to be accessed in the overlay network. Based on the identification information, the user can access the computer system where the shared file is present via the overlay network.

Conventionally, to build the overlay network, identification information of a participating computer system, and identification information in the network which becomes necessary for accessing via an actual network are necessary. For example, the former is a host name of the computer system, and the latter is an IP address allocated to the computer system.

The computer system participating in the overlay network has to manage such identification information, and exchange identification information with the other computer system participating in the overlay network to update contents.

By executing the updating properly, the computer system can dynamically participate in or withdraw from the overlay network as occasion demands, and the computer systems which participate in the overlay network can be easily managed.

For management of the computer systems which participate in the overlay network, two methods are available, i.e., a method of managing information of all participating computer systems in each computer system, and a method of managing only information of some computer systems in each computer system. As each computer system can understand all the computer systems participating in the overlay network, the former method has a feature that a node storing a shared file is searched for in the case of actually accessing the shared file, and efficiency is high when access is made to the shared file. On the other hand, as update information has to be reflected in all the participating computer systems each time the computer system participates in or withdraws from the overlay network, there is a problem of reduced efficiency for managing the participating computer systems.

In the case of the latter method, each computer system manages information of some computer systems among the computer systems participating in the overlay network. Accordingly, updating of information managed by each computer system each time a computer system participates in or withdraws from the overlay network can be minimized, and its influence can be reduced. In the case of the latter method, when access to the shared file is actually made, by making an inquiry to the other computer systems participating in the overlay network, information of the computer system which has participated in or withdrawn from the network can be obtained. In this case, overheads occur because of the inquiry made about the information of the computer system. However, the overheads are much smaller as compared with those when the management information of the computer systems participating in the overlay network is updated. Especially, overheads are conspicuously large when a large-scale overlay network is run.

SUMMARY

Regarding the latter method, JP 2007-28400 A discloses a technology of reducing actual network loads by building an overlay network based on localities of participating computer systems. According to the technology described in JP 2007-28400 A, when a computer system that is to participate in the overlay network transmits request information of participation in the overlay network, information indicating a reachable range of the transmitted request information is set. Thus, propagation of the request information of participation can be locally limited, and updating of management information of each computer system can be locally suppressed when the computer system participates in the overlay network.

In the case of the technology described in JP 2007-28400 A, however, when file share services using the overlay network are provided, the location of a computer system which stores a shared file cannot be designated or controlled. For example, if a shared file whose distributable or sharable countries or regions are limited because of a copyright or other problems is shared among the file share services described in JP 2007-28400 A, the shared file may be stored in a computer system installed in a country or a region where distribution and sharing are not permitted. Management of the file which cannot be used in the computer system reduces storage use efficiency of the computer system. Additionally, because the location (country or region) where an access requester of access to the shared file is present is not identified at the time of access control, there arises a problem in that control carried out to deny access for a user present in a location where access not permitted is difficult. For example, because where the access requester is present is not identified, access to contents denied for access from the US cannot be denied to users permitted for access in Japan during their stay in the US.

In the case of the technology described in JP 2007-28400 A, communication charges between the computer systems in the overlay network or between Internet service providers (ISP) for providing network connection services are not taken into consideration. Thus, even when network loads can be reduced, extra communication fees may be charged. The increase of communication charges may increase ISP loads, consequently reducing quality of ISP network services.

A problem of the former case is that control of the shared file storage location and access control to the shared file are carried out without taking localities in the overlay network into consideration. It is expected that information shared and distributed via the network will increase, and information involving rights regarding copyrights will be contained. Accordingly, for providing file share services using the overlay network, a technology solving this problem will be necessary.

A problem of the latter case is that the network is used without taking actual communication charges of the network into consideration. It is expected that a network represented by the Internet will come into wider use, thereby increasing an information distribution amount. In such a case, to enable the ISP providing network connection services to continuously provide proper network service quality, a technology capable of minimizing use of a network which increases ISP loads will be necessary.

A representative aspect of this invention is as follows. That is, there is provided a controller installed in a computer system, the computer system having: a plurality of data storage systems for storing copies of data in a distributed manner; at least one controller for controlling access to the data stored in the plurality of data storage systems; and a network for coupling the at least one controller. The each controller comprising: an interface coupled to the network; a processor coupled to the interface; and a storage unit coupled to the processor. The storage unit holds attribute information indicating whether to permit access to the data. The processor is configured to: receive a writing request of the data from a client computer coupled to the network; judge whether the each controller permits the requested writing based on the held attribute information and information of a location where the each controller is installed; and write the data in a data storage system controlled by a controller judged to permit the writing.

According to the aspect of this invention, by designating the installation location of the storage destination controller of shared data and the access permitted location for each piece of the data, access from the location where the access is not permitted can be denied. Moreover, by suppressing storage of the data in the controller installed in the location where the storage of the shared data is not permitted, unnecessary communication can be removed to suppress wasteful use of the storage system.

At the time of accessing the data, by carrying out control to preferentially access the data of the controller with a minimum communication charge, communication charges necessary for file share services can be reduced. The reduction of communication charges enables reduction of loads of the ISP for providing network connection services, and the ISP can provide sustainable network services of proper quality.

BRIEF DESCRIPTION OF THE DRAWINGS

The present invention can be appreciated by the description which follows in conjunction with the following figures, wherein:

FIG. 6 is a diagram showing a configuration of the shared file metadata management table in accordance with the first embodiment of this invention;

FIG. 15 is a diagram showing a configuration of the ISP information management table in accordance with the second embodiment of this invention;

FIG. 16 is a diagram showing a configuration of the node management table in accordance with the second embodiment of this invention;

FIG. 17 is a diagram showing a configuration of the node installation location information management table in accordance with the second embodiment of this invention;

DETAILED DESCRIPTION OF THE PREFERRED EMBODIMENTS

Figure 1:
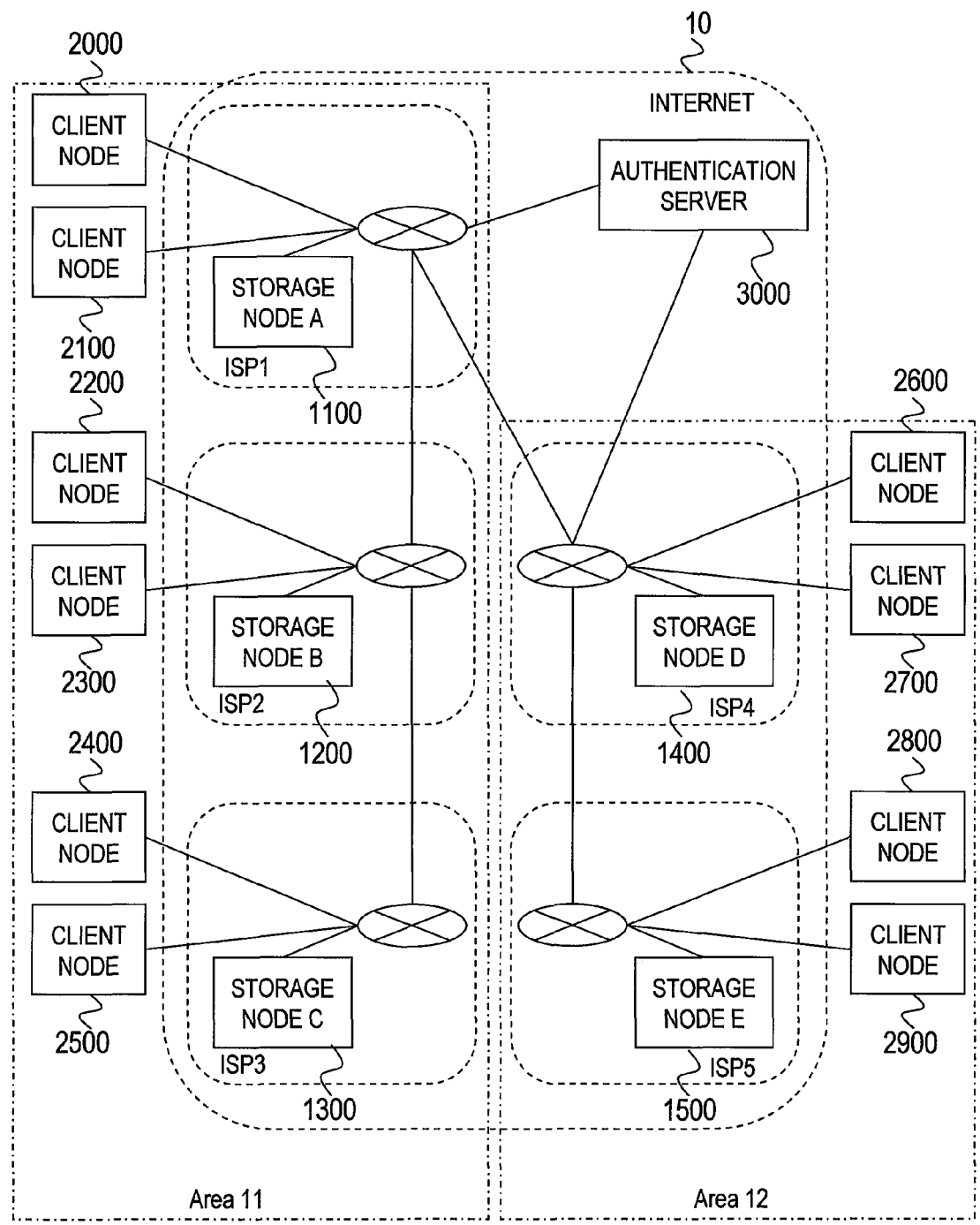
FIG. 1 is a configuration diagram showing a configuration of a computer system in accordance with a first embodiment of this invention.

Referring to the drawings, the preferred embodiments of this invention will be described bellow.

First Embodiment

First, a system according to a first embodiment of this invention will be described.

FIG. 1 illustrates a configuration of the computer system according to the first embodiment of this invention.

The computer system includes ISPs 1 to 5. The ISPs 1 to 5 are intercoupled via Internet 10. An authentication server 3000 is coupled to the Internet 10.

A storage node A1100 and client nodes 2000 and 2100 are coupled to the ISP 1. A storage node B1200 and client nodes 2200 and 2300 are coupled to the ISP 2. A storage node C1300 and client nodes 2400 and 2500 are coupled to the ISP 3. A storage node D1400 and client nodes 2600 and 2700 are coupled to the ISP 4. A storage node E1500 and client nodes 2800 and 2900 are coupled to the ISP 5.

The storage node A1100 cooperates with the other storage node (e.g., storage node B 1200) via the Internet 10 to build an overlay network, thereby providing file share services. The storage nodes B1200, C1300, D1400, and E1500 have similar configuration to the storage node A.

The client node 2000 is a device of a user who utilizes file share services. The client nodes 2100, 2200, 2300, 2400, 2500, 2600, 2700, 2800, and 2900 have similar configuration to the client node 2000.

The ISPs 2 to 5 have similar configuration to the ISP 1. The ISPs 1 to 3 are included in Area 11. The ISPs 4 and 5 are included in Area 12. The Areas 11 and 12 indicate the same location (e.g., country or region).

The authentication server 3000 authenticates a presence location of a client (e.g., client node 2000) which requests access.

FIG. 1 shows five ISPs. However, any number of ISPs may be set. A network structure to which each ISP is coupled is not limited to the form shown in FIG. 1. An arbitrary network structure (e.g., ring type or star type) may be employed.

In an example shown in FIG. 1, one storage node is coupled to each ISP. However, any number of storage nodes may be coupled. Two client nodes are coupled to each ISP. However, any number of client nodes may be coupled.

Figure 2:
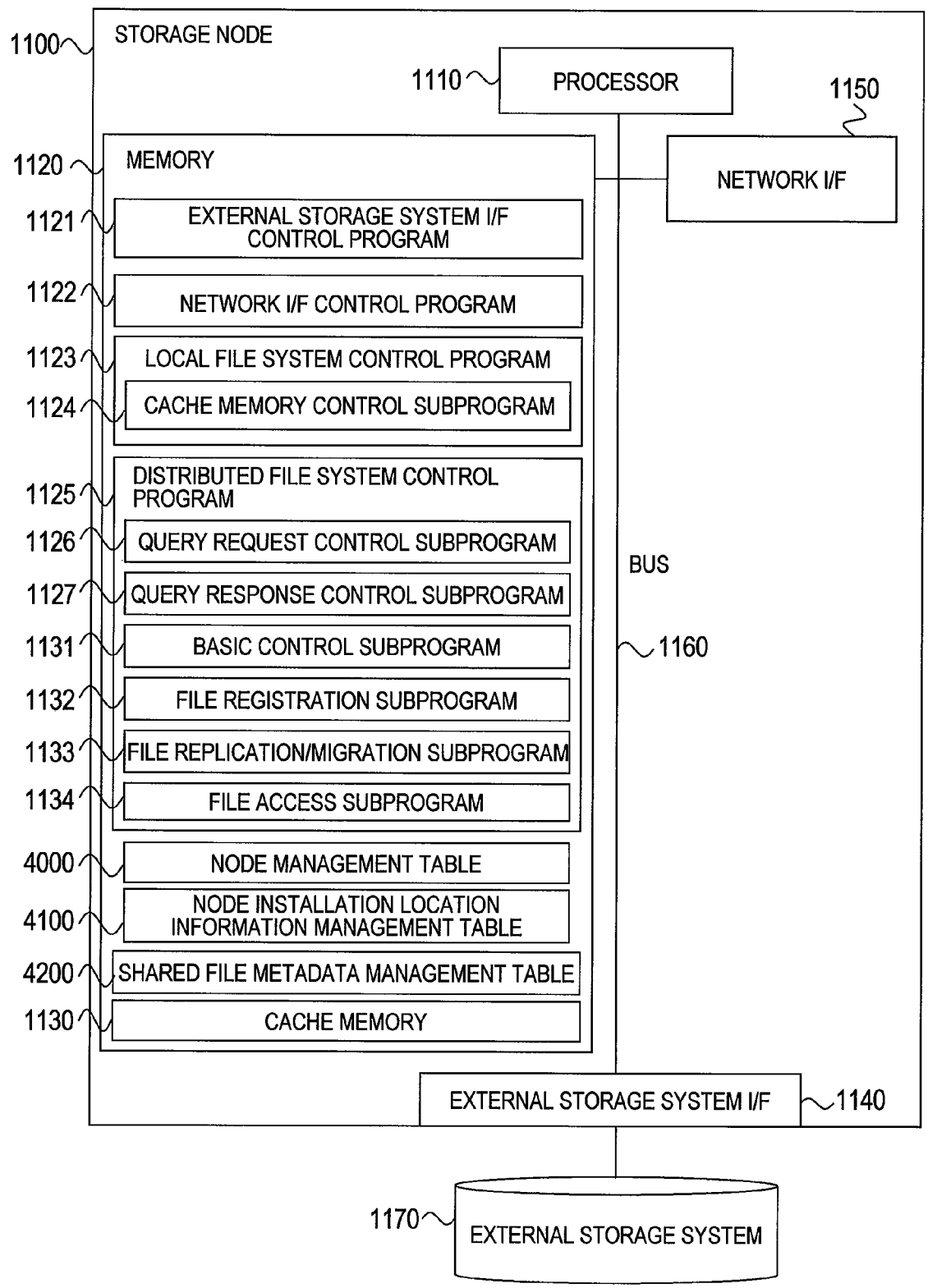
FIG. 2 is a block diagram showing a hardware configuration of the storage node in accordance with the first embodiment of this invention.

FIG. 2 illustrates a hardware configuration of the storage node A1100 according to the first embodiment of this invention.

The storage node A1100 includes a processor 1110, a memory 1120, an external storage system I/F 1140, and a network IF 1150. These components are intercoupled via a bus 1160. The storage node A1100 is coupled to an external storage system 1170 via the external storage system I/F 1140.

The processor 1110 executes a program stored in the memory 1120 to control the entire storage node A1100.

The memory 1120 temporarily stores the program and/or data executed by the processor 1110. The memory 1120 may include a semiconductor memory such as a RAM.

The memory 1120 stores an external storage system I/F control program 1121, a network I/F control program 1122, a local file system control program 1123, a distributed file system control program 125, a node management table 4000, a node installation location information management table 4100, a shared file metadata management table 4200, and a cache memory 1130.

The external storage system I/F control program 1121 controls the external storage system I/F 1140. The network I/F control program 1122 controls the network I/F 1150.

The local file system control program 1123 contains a cache memory control subprogram 1124. The local file system control program 1123 controls a file system provided by the storage node A1100. The cache memory control subprogram 1124 controls the cache memory 1130.

The distributed file system control program 1125 contains a query request control subprogram 1126, a query response control subprogram 1127, a basic control subprogram 1131, a file registration subprogram 1132, a file replication/migration subprogram 1133, and a file access subprogram 1134.

The distributed file system control program 1125 controls file share services which have used the overlay network.

The query request control subprogram 1126 controls a query request transmitted to the other storage node constituting the overlay network. The query request is a request transmitted when information (e.g., identification information of the other storage node constituting the overlay network) is desired to be obtained from the other storage node.

The query response control subprogram 1127 receives a query request from the other storage node constituting the overlay network, executes a process of obtaining requested information, and controls a response of a processed result.

The basic control subprogram 1131 manages information of the storage node A1100. For example, the basic control subprogram 1131 registers information (identification information) regarding the storage node A1100 in the node management table 4000.

The file registration subprogram 1132 registers a shared file in the overlay network.

The file replication/migration subprogram 1133 replicates or migrates the shared file registered in the overlay network.

The file access subprogram 134 controls access requested to the shared file registered in the overlay network from a client (e.g., client node 2100).

The node management table 4000 holds identification information of a storage node present in the overlay network. The node management table 4000 will be described below referring to FIG. 4.

The node installation location information management table 4100 holds information regarding a location where a storage node is present. The node installation location information management table 4100 will be described below referring to FIG. 5.

The shared file metadata management table 4200 holds metadata registered in the shared file stored in the storage node. The shared file metadata management table 4200 will be described below referring to FIG. 6.

The cache memory 1130 is used for shortening access response time when the local file system control program 2023 accesses a file managed by the file system.

The external storage system I/F 1140 is an interface for accessing the external storage system 1170. The network I/F 1150 is an interface for accessing the other system coupled via the network.

The external storage system 1170 stores a shared file. The external storage system 1170 may include, for example, a hard disk drive (HDD). Alternatively, a semiconductor memory device such as a flash memory may be used.

Figure 3:
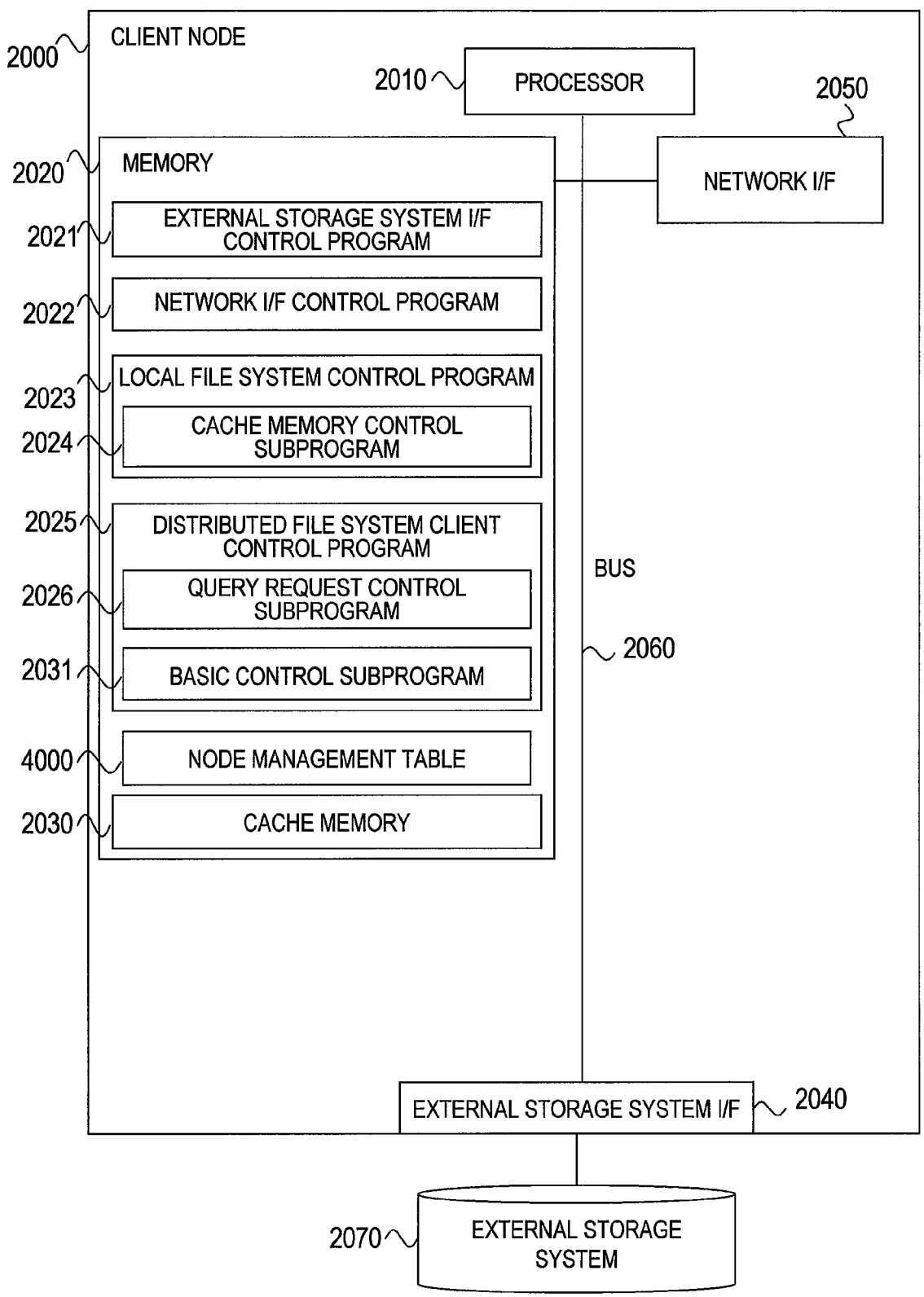
FIG. 3 is a block diagram showing a hardware configuration of the client node in accordance with the first embodiment of this invention.

FIG. 3 illustrates a hardware configuration of the client node 2000 according to the first embodiment of this invention.

The client node 2000 includes a processor 2010, a memory 2020, an external storage system I/F 2040, and a network IF 2050. These components are intercoupled via a bus 2060. The client node 2000 is coupled to an external storage system 2070 via the external storage system I/F 2040.

The processor 2010 executes a program stored in the memory 2020 to control the entire client node 2000.

The memory 2020 temporarily stores the program and/or data executed by the processor 2010. The memory 2020 may include a semiconductor memory such as a RAM.

The memory 2020 stores an external storage system I/F control program 2021, a network I/F control program 2022, a local file system control program 2023, a distributed file system client control program 2025, the node management table 4000, and a cache memory 2030.

The external storage system I/F control program 2021 controls the external storage system I/F 2040. The network I/F control program 2022 controls the network I/F 2050.

The local file system control program 2023 contains a cache memory control subprogram 2024. The local file system control program 2023 controls a file system provided by the client node 2000. The cache memory control subprogram 2024 controls the cache memory 2030.

The distributed file system client control program 2025 contains a query request control subprogram 2026, and a basic control subprogram 2031.

The distributed file system client control program 2025 controls file share services which have used the overlay network.

The query request control subprogram 2026 transmits a query request, a file registration request, a shared file access request, and the like to the storage node for providing file share services using the overlay network.

The basic control subprogram 2031 manages information of the client node 2000. For example, the basic control subprogram 2031 registers information (identification information) regarding a storage node accessed by the client node 2000 in the node management table 4000.

The node management table 4000 holds only information regarding the storage node directly accessed first from the client node 2000. The node management table 4000 of the client node 2000 and the node management table 4000 of the storage node A1100 may be synchronized to hold the same information. In the case of holding the same information, the same information as that of the node management table 4000 held by the storage node A1100 may be held in the node management table 4000 of the client node 2000.

The cache memory 2030 is used for shortening access response time when the local file system control program 2023 accesses a file managed by the file system.

The external storage system I/F 2040 is an interface for accessing the external storage system 2070. The network I/F 2050 is an interface for accessing the other system coupled via the network.

The external storage system 2070 stores a program or user data. The external storage system 2070 may include, for example, a hard disk drive (HDD). Alternatively, a semiconductor memory device such as a flash memory may be employed.

Figure 4:
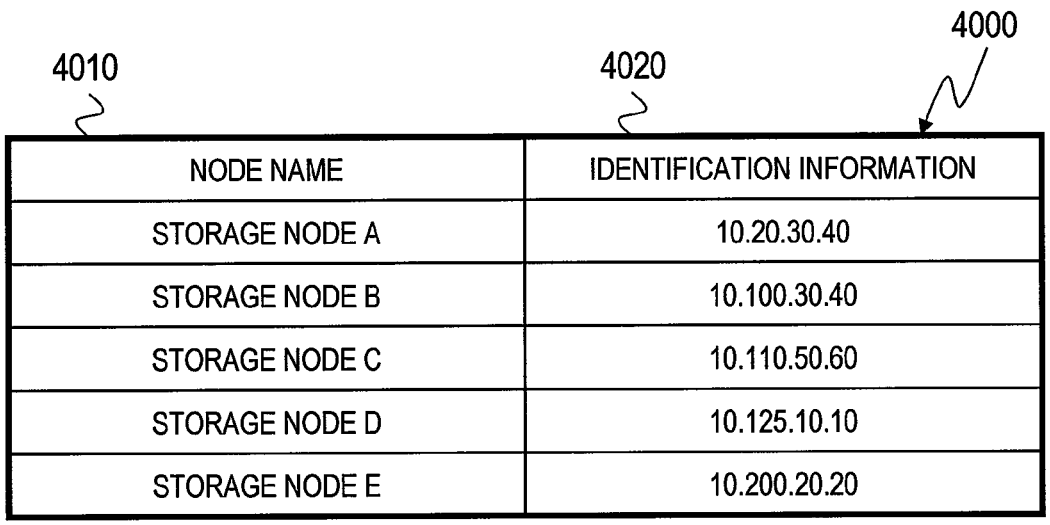
FIG. 4 is a diagram showing a configuration of the node management table in accordance with the first embodiment of this invention.

FIG. 4 illustrates a configuration of the node management table 4000 according to the first embodiment of this invention.

The node management table 4000 holds identification information of a storage node recognized to be present in the overlay network.

The node management table 4000 includes a node name 4010 and identification information 4020.

The node name 4010 is information for identifying a storage node in the overlay network. In the node name 4010 shown in FIG. 4, information of a character string is stored. However, information of a numerical value such as node ID may be stored.

The identification information 4020 is identification information of a storage node recognized in a normal network. The identification information 4020 is used for designating an access destination when the storage node is accessed via the network. In the identification information 4020 shown in FIG. 4, an IP address is stored. However, for example, ID information for specifying a storage node may be stored. Alternatively, information of a character string may be stored.

In an example shown in FIG. 4, five pieces of storage node information are stored. "STORAGE NODE A" and "10. 20. 30. 40" are respectively stored in a node name 4010 and identification information 4020 of a first line of the node management table 4000. These indicate that a storage node named "STORAGE A" participating in the overlay network is present, and "STORAGE NODE A" can be accessed based on information of the destination "10. 20. 30. 40".

Figure 5:
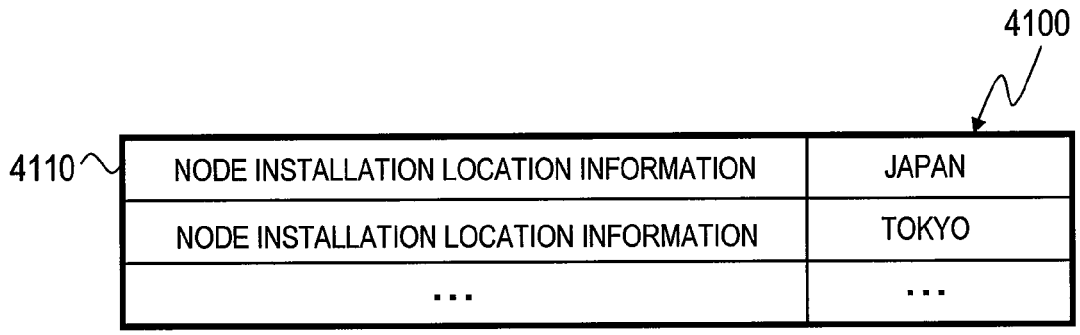
FIG. 5 is a diagram showing a configuration of the node installation location information management table in accordance with the first embodiment of this invention.

FIG. 5 illustrates a configuration of the node installation location information management table 4100 according to the first embodiment of this invention.

The node installation location information management table 4100 manages information regarding a location where a storage node is present.

The node installation location information management table 4100 includes node installation location information 4110. The node installation location information 4110 is information for identifying a location where a storage node is installed.

In the node installation location information 4100 shown in FIG. 5, certain information or all pieces of information regarding an actual address are stored. However, for example, identification information (IP address) may be stored in a tiered manner. Alternatively, ID information for specifying a location may be stored.

In an example shown in FIG. 5, two pieces of information regarding an installation location of a storage node are stored. In the node installation location information 4110 of the node installation location information management table 4100, "JAPAN" and "TOKYO" are stored. These indicate that the storage node A1100 is installed in a location called "TOKYO" of "JAPAN".

FIG. 6 illustrates a configuration of the shared file metadata management table 4200 according to the first embodiment of this invention.

The shared file metadata management table 4200 manages metadata registered in a shared file stored in the external storage system 1170 coupled to the storage node A1100 for each shared file.

The shared file data management table 4200 includes, in addition to existing metadata (e.g., storage date and keyword), information of storing permitted location 4210, information of storing denied location 4220, information of access permitted location 4230, and information of access denied location.

The information of storing permitted location 4210 is for specifying a location where a shared file can be stored. Specifically, a client (e.g., client node 2000) can store a shared file only in an external storage system coupled to a storage node installed in a location designated by the information of storing permitted location 4210.

In contrast to the information of storing permitted location 4210, the information of storing denied location 4220 is information for designating a location where a shared file cannot be stored. Specifically, a client (e.g., client node 2000) cannot store any shared file in an external storage system coupled to a storage node installed in a location designated by the information of storing denied location 4220.

The information of access permitted location 4230 is information for designating a location where access is permitted when a request of access to a shared file is received. Specifically, only an access requester (e.g., client node 2000) judged to be present in a location designated by the information of access permitted location 4230 can access a shared file. The access to the shared file means reading of the shared file, writing of the shared file, copying of the shared file, or migration of the shared file.

In contrast to the information of access permitted location 4230, the information of access denied location 4240 is information for designating a location where access is denied when a request of access to a shared file is received. Specifically, an access requester judged to be present in a location designated by the information of access denied location 4240 cannot access a shared file.

In an example shown in FIG. 6, one piece of information is stored. However, a plurality of pieces of information may be stored as occasion demands.

When information of the same location is stored in the information of storing permitted location 4210 and the information of storing denied location 4220, contents stored in the information of storing denied location 4220 are preferentially used. When information of the same location is stored in the information of access permitted location 4230 and the information of access denied location 4240, contents stored in the information of access denied location 4240 are preferentially stored.

As shown in FIG. 6, when no value is stored, "Null" is stored. When "Null" is stored, there is no location to be designated.

In an example shown in FIG. 6, the information of storing permitted location 4210, the information of storing denied location 4220, the information of access permitted location 4230, and the information of access denied location 4240 are stored in the shared file metadata management table 4200. "JAPAN", "Null", "Null", and "UNITED STATES" are stored in the information of storing permitted location 4210, the information of storing denied location 4220, the information of access permitted location 4230, and the information of access denied location 4240 of a first line of the shared file metadata management table 4200. These indicate that a shared file can be stored in a storage node installed in a location "JAPAN", and access from an access requester present in a location "UNITED STATES" is denied.

Figure 7:
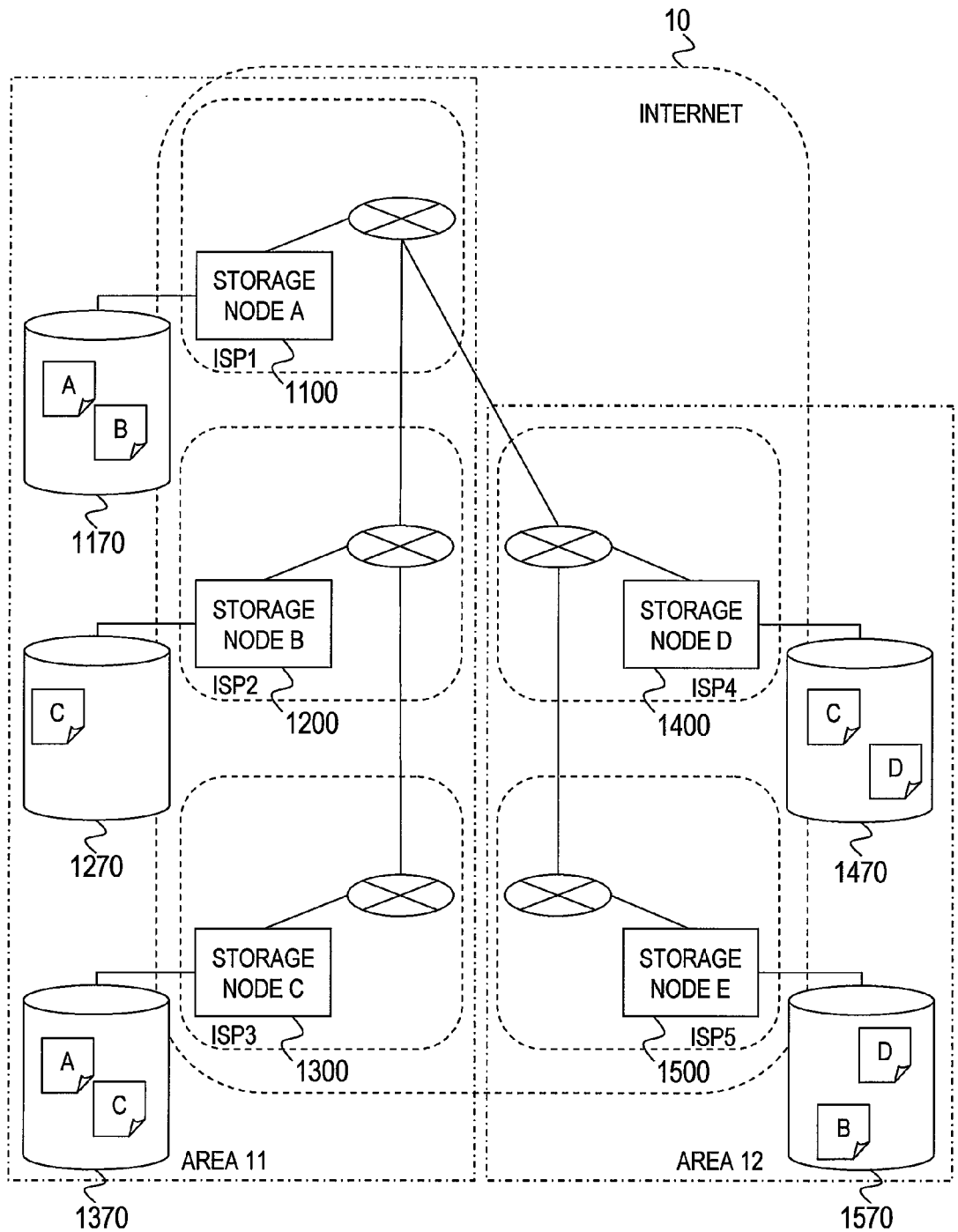
FIG. 7 is a diagram showing schematically a shared file which is stored in the storage nodes in accordance with the first embodiment of this invention.

FIG. 7 schematically illustrates which of the storage nodes a shared file is stored in the system configuration of the first embodiment of this invention.

In an example shown in FIG. 7, "A", "B", "C", and "D" are stored as shared files in the external storage systems. In this case, the shared file "A" is distributed to be stored in two locations, i.e., the external storage system 1170 coupled to the storage node A1100 and the external storage system 1370 coupled to the storage node C1300. The shared file "B" is distributed to be stored in the external storage system 1170 coupled to the storage node A1100, and the external storage system 1570 coupled to the storage node E1500. The shared file "C" is distributed to be stored in the external storage system 1270 coupled to the storage node B1200, the external storage system 1370 coupled to the storage node C1300, and the external storage system 1470 coupled to the storage node D1400. The shared file "D" is distributed to be stored in the external storage system 1470 coupled to the storage node D1400, and the external storage system 1570 coupled to the storage node E1500.

It is presumed that for the shared file "A", information "Area 11" is stored in the information of storing permitted location 4210 of the shared file metadata management table 4200. In this case, when the shared file "A" is registered in file share services, a storage node which becomes a storage destination of a shared file is selected from the storage nodes A1100, B1200, and C1300 included in the "Area 11".

Figure 8:
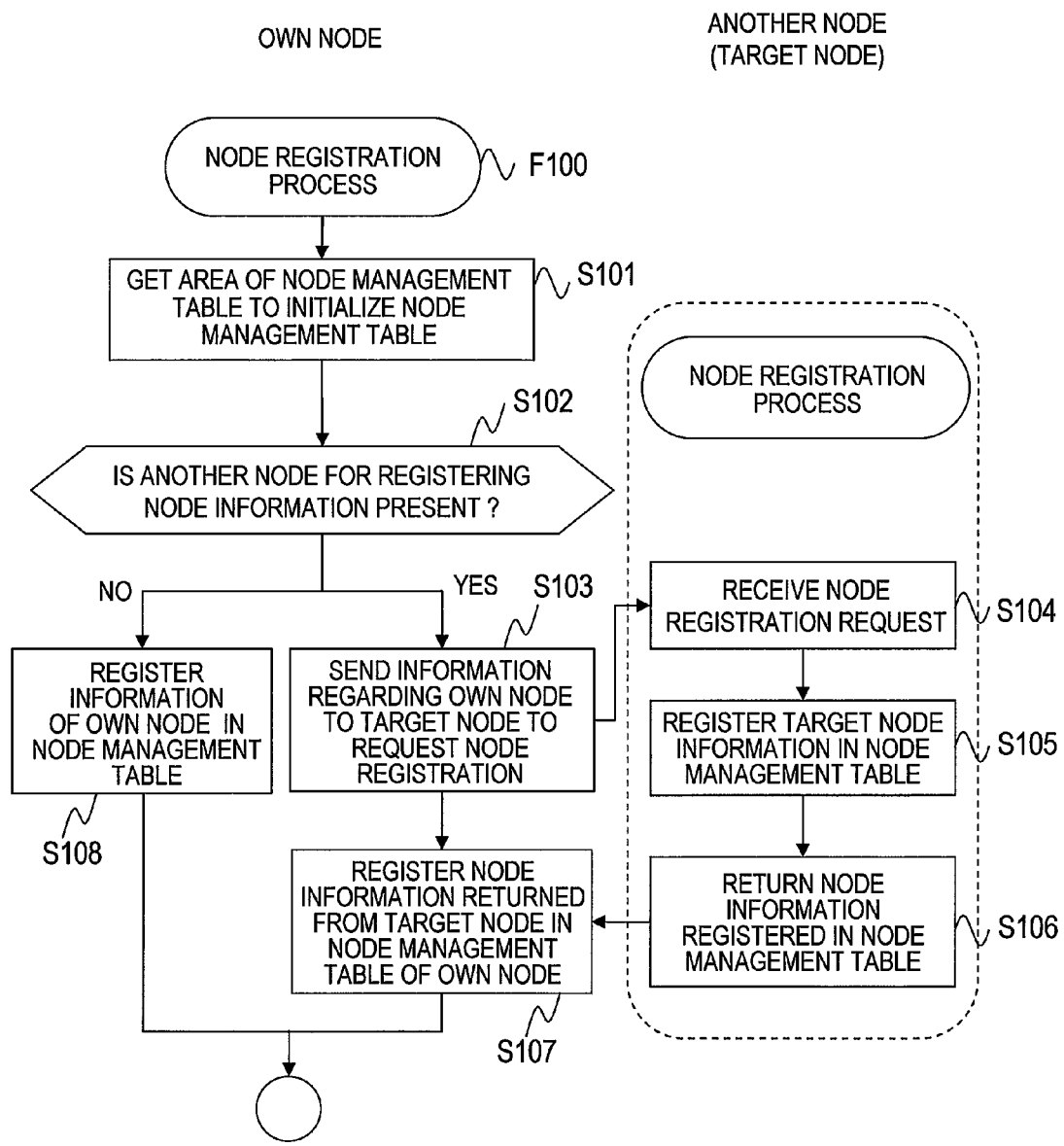
FIG. 8 is a flowchart showing a node registration process in accordance with the first embodiment of this invention.

FIG. 8 is a flowchart showing a node registration process according to the first embodiment of this invention, which is executed by the basic control subprogram 1131 and the query request control subprogram 1126.

The node registration process is executed by a participating storage node (here, referred to as storage node A1100) when a new storage node participates in the overlay network.

First, the basic control subprogram 1131 of the storage node A1100 gets an area for storing information of the storage node A1100 in the node management table 4000, and initializes the got area (S101).

For the overlay network which is a target of participation, the basic control subprogram 1131 of the storage node A1100 judges whether another storage node for registering node information (e.g., node name and identification information) of the storage node A1100 is present (S102). In other words, in the step S102, whether the storage node A1100 is a first storage node to participate in the overlay network is judged.

If another storage node for registering the node information is not present, the storage node A1100 is a first storage node to participate in the overlay network. Accordingly, the node information of the storage node A1100 does not have to be registered in the other storage node. In this case, the process proceeds to step S108.

On the other hand, if another storage node for registering the node information is present, the other storage node has participated in the overlay network. Accordingly, the storage node A1100 has to register own node information in the other storage node participating in the overlay network. In this case, the process proceeds to step S103. To judge whether the other storage node participates in the overlay network, it can be judged based on whether identification information (e.g., IP address) regarding the other storage node is held when participating in the overlay network.

The query request control subprogram 1126 of the storage node A1100 requests node registration in the overlay network together with information regarding the storage node A1100 to the other storage node which participates in the overlay network (S103).

When participating in the overlay network, node information provided beforehand is designated to be transmitted to a storage node (hereinafter, referred to as target node) which requests node registration. The node information transmitted together with the node registration request contains a node name of the storage node A1100, and identification information (e.g., IP address) in the network.

Upon reception of the node registration request, a node registration process is executed by the basic control subprogram 1131 and the query response control subprogram 1127.

First, the query response control subprogram 1127 of the target node receives the node registration request (S104).

The basic control subprogram 1131 of the target node stores information of the storage node A1100 which has requested the node registration in the node management table 4000 of the target node (S105).

The query response control subprogram 1127 of the target node transmits the node information stored in the node management table 4000 to the storage node A1100 (S106). Specifically, the basic control subprogram 1131 of the target node reads the node information (e.g., node name 4010 and identification information 4020) stored in the node management table 4000, and the query response control subprogram 1127 of the target node transmits the read node information together with a response of node registration success to the storage node A1100.

The basic control subprogram 1131 of the storage node A1100 stores the node information transmitted from the target node in the node management table 4000 of the storage node A1100 (S107). Specifically, the query request subprogram 1126 of the storage node A1100 receives a response of the node registration from the target node. When the response is a node registration success, the basic control subprogram 1131 of the storage node A1100 stores the node information transmitted together with the node registration response in the node management table 4000 of the storage node A1100. Then, the process is finished.

In step S108, the basic control subprogram 1131 of the storage node A1100 stores the node information of the storage node A1100 in the node management table 4000 (S108). Then, the process is finished.

Figure 9:
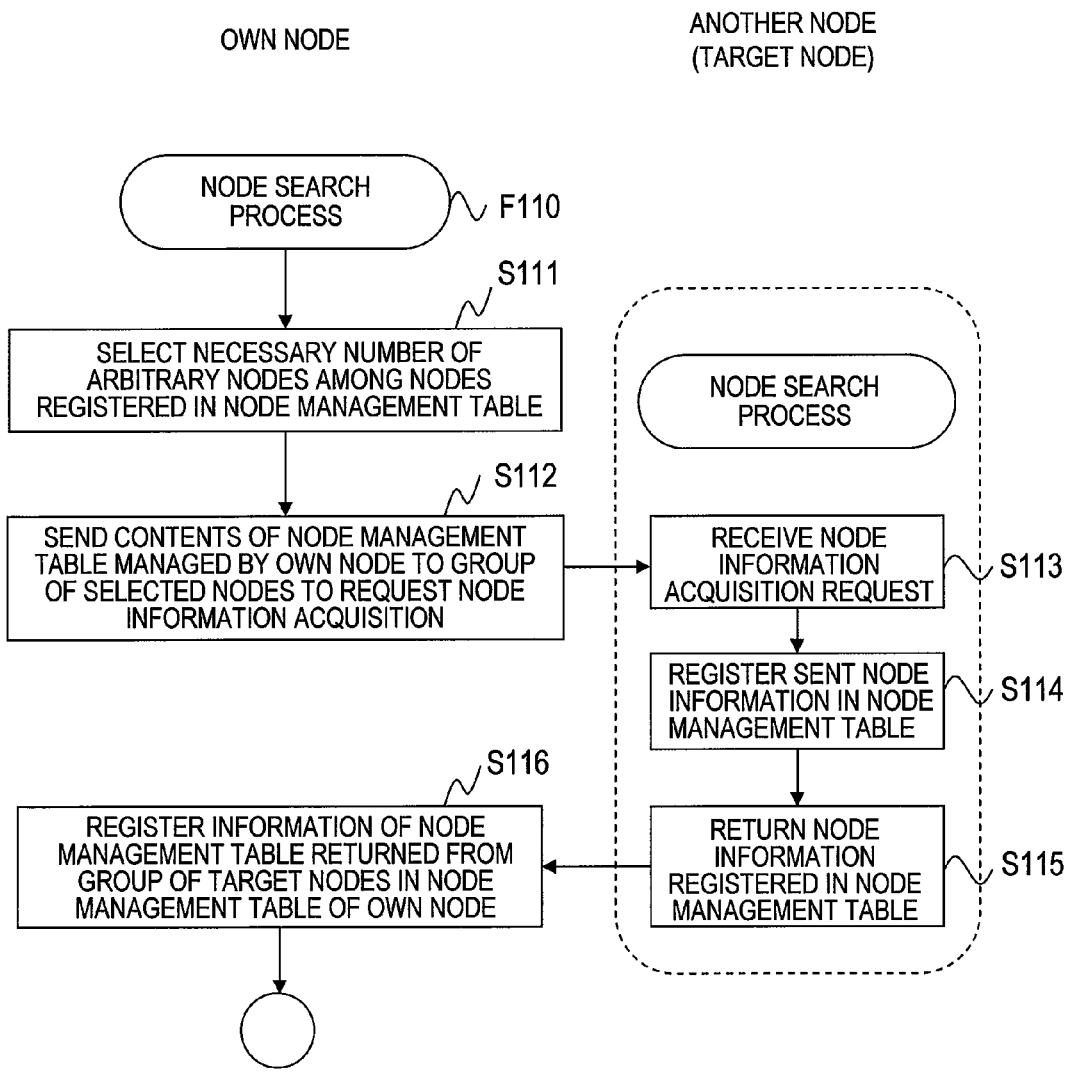
FIG. 9 is a flowchart showing a node search process in accordance with the first embodiment of this invention.

FIG. 9 is a flowchart showing a node search process according to the first embodiment of this invention, which is executed by the basic control subprogram 1131 and the query request control subprogram 1126.

The node search process is carried out when the storage node (here, referred to as storage node A1100) participating in the overlay network searches for other participating storage nodes.

First, the basic control subprogram 1131 of the storage node A1100 selects a necessary number of arbitrary storage nodes from a list of storage nodes registered in the node management table 4000 (S111).

The necessary number of storage nodes is selected, because, when node search is requested to all the storage nodes registered in the node management table 4000, node information of the entire overlay network may be obtained, but process loads of storage node searching and updating of the node management table 4000 may increase. Thus, in this case, the necessary number of nodes is selected, and node search is requested to the selected storage node. For a method of selecting storage nodes, for example, a method of randomly selecting storage nodes from the node management table 4000 is available. The necessary number can be changed flexibly by an administrator.

The query request control subprogram 1126 of the storage node A1100 transmits contents of the node management table 4000 held by the storage node A1100 to the storage node (hereinafter, referred to as target node) selected in the step S111 to request acquisition of node information (e.g., node name and identification information) (S112).

The contents of the node management table 4000 to be transmitted contain all data (e.g., node name and identification information). Only certain data (e.g., only identification information) may be contained.

Upon reception of the node information acquisition request, a node search process is executed by the basic control subprogram 1131 and the query response control subprogram 1127.

First, the query response control subprogram 1127 of the target node receives the node information acquisition request transmitted in the step S112 (S113).

The basic control subprogram 1131 of the target node stores node information transmitted from the storage node A1100 which has requested the acquisition of node information in the node management table 4000 of the target node (S114).

The query response control subprogram 1127 of the target node transmits the node information stored in the node management table 4000 to the storage node A1100 (S115). Specifically, the basic control subprogram 1131 of the target node read the node information stored in the node management table 4000. The query response control subprogram 1127 of the target node transmits the read node information together with a response to the node information acquisition request to a request source (storage node A1100) of the node information acquisition.

As in the case of the step S112, the contents of the node information to be transmitted contain all data (e.g., node name 4010 and identification information 4020). Only certain data (e.g., only identification information 4020) may be contained.

The basic control subprogram 1131 of the storage node A1100 stores the node information transmitted from the target node in the step S115 in the node management table 4000 of the storage node A1100 (S116). Specifically, the query request subprogram 1126 of the storage node A1100 receives a response to the node information acquisition request from the target node. The basic control subprogram 1131 of the storage node A1100 stores the node information transmitted together with the response in the node management table 4000 of the storage node A1100. Then, the process is finished.

The node search process is carried out to, for example, periodically update information. When node registration is requested, the node search process may be executed to quickly propagate information of the storage node which has requested the node registration to the other storage node.

The node search process may be executed each time a node is registered in the overlay network or a storage node withdraws from the network.

Only an outline of a node withdrawal process will be described without using any drawings. For example, upon execution of the node search process, when the target node tries to access a withdrawn storage node, by using a storage node which has not responded within a predetermined time as a withdrawn node, information of a storage node not responded from the own node management table 4000 is deleted.

Figure 10:
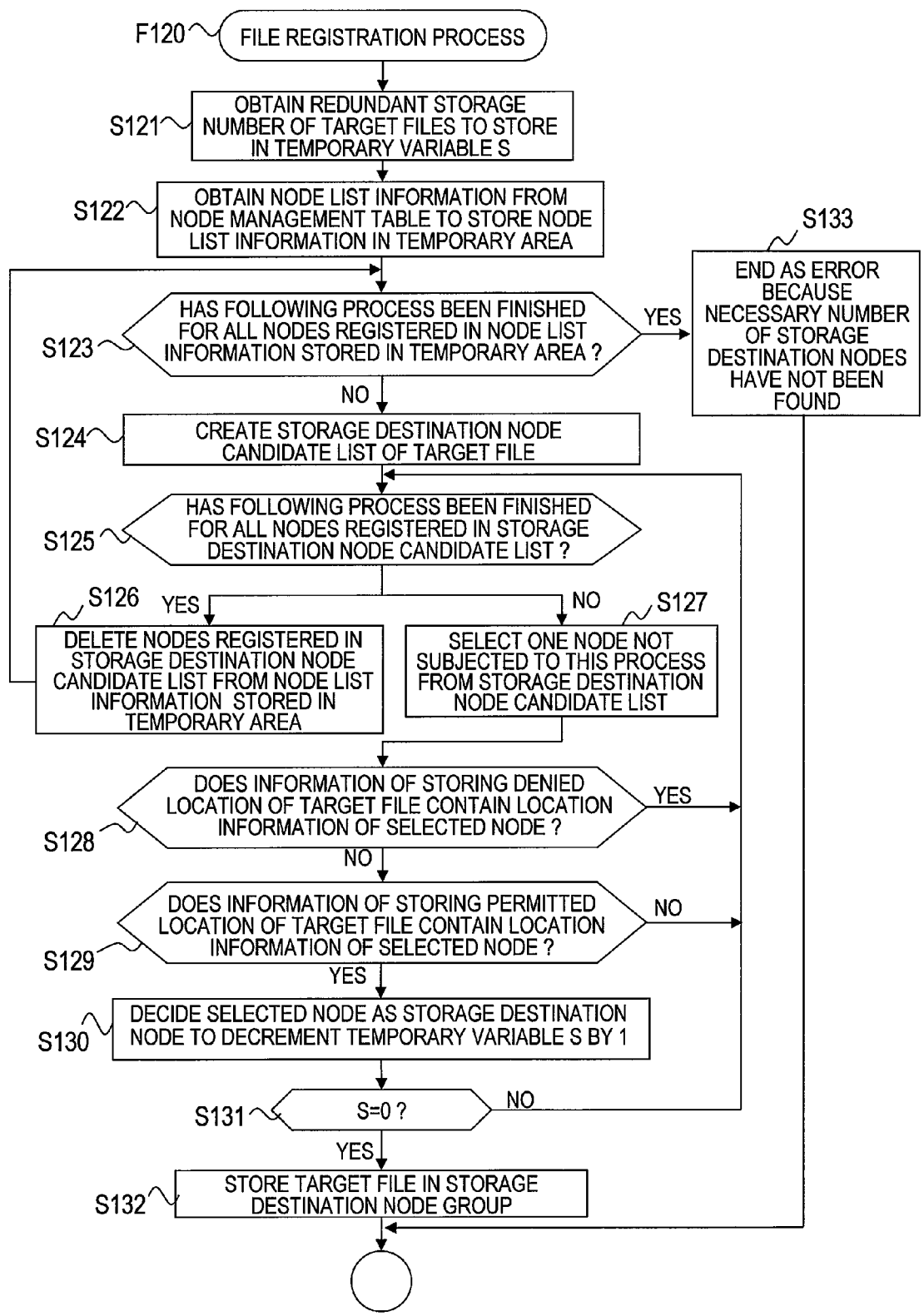
FIG. 10 is a flowchart showing a file registration process in accordance with the first embodiment of this invention.

FIG. 10 is a flowchart showing the file registration process carried out by the file registration subprogram 1132 according to the first embodiment of this invention.

The file registration process is executed by a storage node (here, referred to as storage node A1100) which requests registration of a shared file when a new shared file is registered in the overlay network.

First, the file registration subprogram 1132 obtains the number of stored redundancies of a new shared file to be registered (hereinafter, referred to as target file) to store it in a temporary variable "S" (S121). The number of stored redundancies is the number of copies of the target file to distribute and store the target file. For the number of stored redundancies, for example, a value designated as metadata of the target file is used. Alternatively, a value defined by the entire system may be used.

The file registration subprogram 1132 obtains node list information from the node management table 4000 to store it in a temporary area (S122). The node list information contains, for example, a node name and identification information.

The file registration subprogram 1132 judges whether a process of step S124 and the following steps has been finished for all the storage nodes registered in the node list information stored in the step S122 (S123).

If the process of the step S124 and the following steps has been finished for all the storage nodes, the necessary number of storage nodes (number of stored redundancies) which become storage destinations of the target file is not secured. Thus, the process proceeds to step S133.

On the other hand, if the process of the step S124 and the following steps has not been finished for all the storage nodes, the file registration subprogram 1132 has to get the necessary number of storage nodes which become storage destinations of the target file. In this case, the process proceeds to the step S124.

The file registration subprogram 1132 selects storage destination node candidates from the node list information obtained in the step S122 to create a storage destination node candidate list (S124). For a method of selecting the storage destination node candidates, for example, a method of selecting storage node candidates in order registered in the node list information is available. Alternatively, a method of randomly selecting storage node candidates may be used. Otherwise, a method of selecting storage node candidates by using hash values of node names so that the storage nodes of the storage destination can be uniformly distributed may be used.

The file registration subprogram 1132 judges whether a process of step S127 and the following steps has been finished for all the storage nodes registered in the storage destination node candidate list created in the step S124 (S125).

If the process of the step S127 and the following steps has been finished for all the storage nodes, the process proceeds to step S126.

On the other hand, if the process of the step S127 and the following steps has been finished for all the storage nodes, the file registration subprogram 1132 has to get the necessary number of storage nodes which become storage destinations of the target file. In this case, the process proceeds to the step S127.

The file registration subprogram 1132 selects one storage node not subjected to a process of step S128 and the following steps from the storage destination node candidate list (S127). For a method of selecting one storage node, a method of randomly selecting a storage node from the storage destination node candidate list is available.

The file registration subprogram 1132 judges whether the information of storing denied location 4220 of the target file contains location information of the selected storage node (S128). Specifically, the file registration subprogram 1132 refers to the information of storing denied location 4220 stored as metadata of the target file in the shared file metadata management table 4200 to judge whether a location indicated by the information of storing denied location 4220 contains node installation location information 4110 stored in the node installation location information management table 4100 of the storage node selected in the step S127.

If the location information of the selected storage node is contained, the file registration subprogram 1132 judges that the target file cannot be stored in the selected storage node. In this case, the process returns to the step S125.

On the other hand, if the location information of the selected storage node is not contained, the process proceeds to step S129.

The file registration subprogram 1132 judges whether the information of storing permitted location 4210 of the target file contains the location information of the selected storage node (S129). Specifically, the file registration subprogram 1132 refers to information of storing permitted location 4210 stored as metadata of the target file in the shared file metadata management table 4200 to judge whether a location indicated by the information of storing permitted location 4210 contains node installation location information 4110 stored in the node installation location information management table 4100 of the storage node selected in the step S127.

If the location information of the selected storage node is not contained, the file registration subprogram 1132 judges that the target file cannot be stored in the selected storage node. In this case, the process returns to the step S125.

On the other hand, if the location information of the selected storage node is contained, the process proceeds to step S130.

The file registration subprogram 1132 decides the selected storage node to be a storage destination node to decrement the temporary variable "S" (S130).

The file registration subprogram 1132 judges whether the temporary variable "S" is "0" (S131).

If the temporary variable "S" is not "0", it is judged that the necessary number of storage nodes for storing the target file has not been secured. In this case, the process returns to the step S125.

On the other hand, if the temporary variable "S" is "0", it is judged that the necessary number of storage nodes for storing the target file has been secured. In this case, the process proceeds to step S132.

The file registration subprogram 1132 copies the target file by a number of times equal to the number of stored redundancies to store the target file in the storage destination node decided in the step S130 (S132). If the storage destination node is another storage node (target node), the query request control program 1126 requests the target node to store the target file. The query response control program 1127 of the storage node requested to store the target file receives the storage request of the target file to store the target file. Then, a result of the storage is transmitted to a request source of the target file storage request.

In step S126, the file registration subprogram 1132 deletes node information of the storage node registered in the storage destination node candidate list from the node list information stored in the temporary area (S126). Then, the process returns to the step S123.

In step S133, the file registration subprogram 1132 becomes an error because the necessary number of storage destination nodes cannot be found. In this case, the process is finished (S133).

Figure 11:
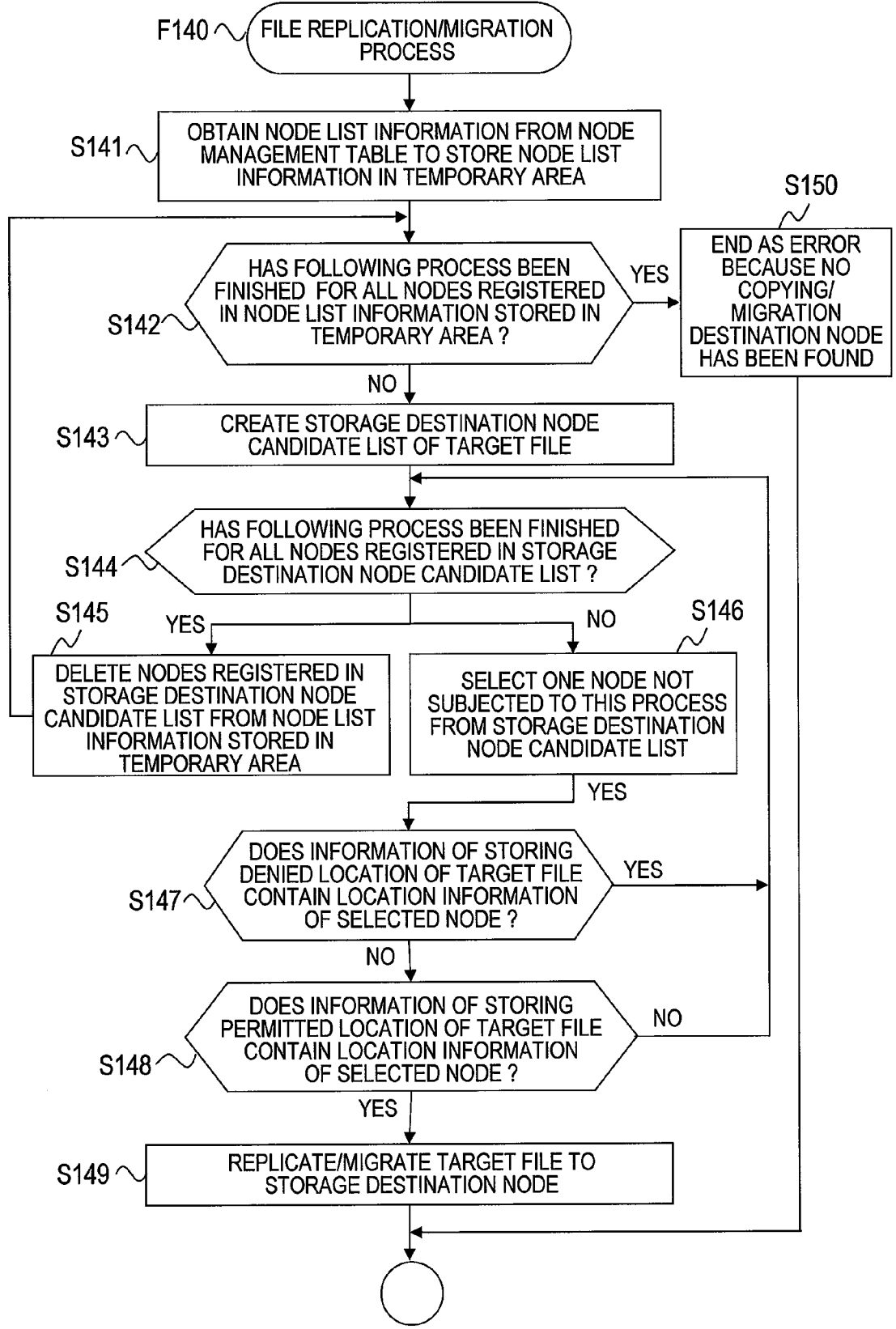
FIG. 11 is a flowchart showing a file migration/replication process in accordance with the first embodiment of this invention.

FIG. 11 is a flowchart showing a file replication/migration process executed by the file replication/migration subprogram 1133 according to the first embodiment of this invention.

When the shared file (hereinafter, referred to as target file) registered in the overlay network is copied or migrated over the storage nodes, the file replication/migration process is executed by the storage node (here, referred to as storage node A1100) which requests copying or migration.

The file replication/migration process enables adjustment of response performance of file access by increasing/decreasing the number of copies of the shared file, and maintenance of access availability to the shared file by migrating the shared file stored in a storage node to be stopped to another storage node beforehand.

First, the file replication/migration subprogram 1133 obtains node list information from the node management table 4000 to store it in a temporary area (S141). The node list information contains, for example, a node name and identification information.

The file replication/migration subprogram 1133 judges whether a process of step S143 and the following steps has been finished for all the storage nodes registered in the node list information stored in the step S141 (S142).

If the process of the step S143 and the following steps has been finished for all the storage nodes, no storage node which becomes a storage destination is secured. Thus, the process proceeds to step S150.

On the other hand, if the process of the step S143 and the following steps has not been finished for all the storage nodes, the file replication/migration subprogram 1133 has to get a storage node which become a storage destination of the target file. In this case, the process proceeds to the step S143.

The file replication/migration subprogram 1133 selects storage destination node candidates from the node list information obtained in the step S141 to create a storage destination node candidate list (S143). For a method of selecting the storage destination node candidates, for example, a method of selecting storage node candidates in order registered in the node list information is available. Alternatively, a method of randomly selecting storage node candidates may be used. Otherwise, a method of selecting storage node candidates by using hash values of node names so that the storage nodes of the storage destination can be uniformly distributed may be used.

The file replication/migration subprogram 1133 judges whether a process of step S146 and the following steps has been finished for all the storage nodes registered in the storage destination node candidate list created in the step S143 (S144).

If the process of the step S146 and the following steps has been finished for all the storage nodes, the process proceeds to step S145.

On the other hand, if the process of the step S146 and the following steps has been finished for all the storage nodes, the file replication/migration subprogram 1133 has to get storage nodes which become storage destinations of the target file. In this case, the process proceeds to the step S146.

The file replication/migration subprogram 1133 selects one storage node not subjected to a process of step S147 and the following steps from the storage destination node candidate list (S146). For a method of selecting one storage node, a method of randomly selecting a storage node from the storage destination node candidate list is available.

The file replication/migration subprogram 1133 judges whether the information of storing denied location 4220 of the target file contains location information of the selected storage node (S147). Specifically, the file replication/migration subprogram 1133 refers to the information of storing denied location 4220 stored as metadata of the target file in the shared file metadata management table 4200 to judge whether a location indicated by the information of storing denied location 4220 contains node installation location information 4110 stored in the node installation location information management table 4100 of the storage node selected in the step S146.

If the location information of the selected storage node is contained, the file replication/migration subprogram 1133 judges that the target file cannot be copied or migrated to the selected storage node. In this case, the process returns to the step S144.

On the other hand, if the location information of the selected storage node is not contained, the process proceeds to step S148.

The file replication/migration subprogram 1133 judges whether the information of storing permitted location 4210 of the target file contains the location information of the selected storage node (S148). Specifically, the file replication/migration subprogram 1133 refers to information of storing permitted location 4210 stored as metadata of the target file in the shared file metadata management table 4200 to judge whether a location indicated by the information of storing permitted location 4210 contains node installation location information 4110 stored in the node installation location information management table 4100 of the storage node selected in the step S146.

If the location information of the selected storage node is not contained, the file replication/migration subprogram 1133 judges that the target file cannot be copied or migrated to the selected storage node. In this case, the process returns to the step S144.

On the other hand, if the location information of the selected storage node is contained, the process proceeds to step S149.

The file replication/migration subprogram 1133 copies or migrates the target file to the storage node (storage destination node) judged to contain the location information in the step S148 (S149). If the storage destination node is another storage node (target node), the query request control program 1126 requests the target node to copy or migrate the target file. The query response control program 1127 of the storage node requested to copy or migrate the target file receives the replication or migration request of the target file to store the replicated or migrated target file. Then, the target node transmits a result of the replication or the migration to the storage node A1100 which has requested the replication or the migration of the target file.

In step S145, the file replication/migration subprogram 1133 deletes node information of the storage node registered in the storage destination node candidate list from the node list information stored in the temporary area (S145). Then, the process returns to the step S142.

In step S150, the file replication/migration subprogram 1133 becomes an error as storage destination nodes cannot be found. In this case, the process is finished (S150).

Figure 12:
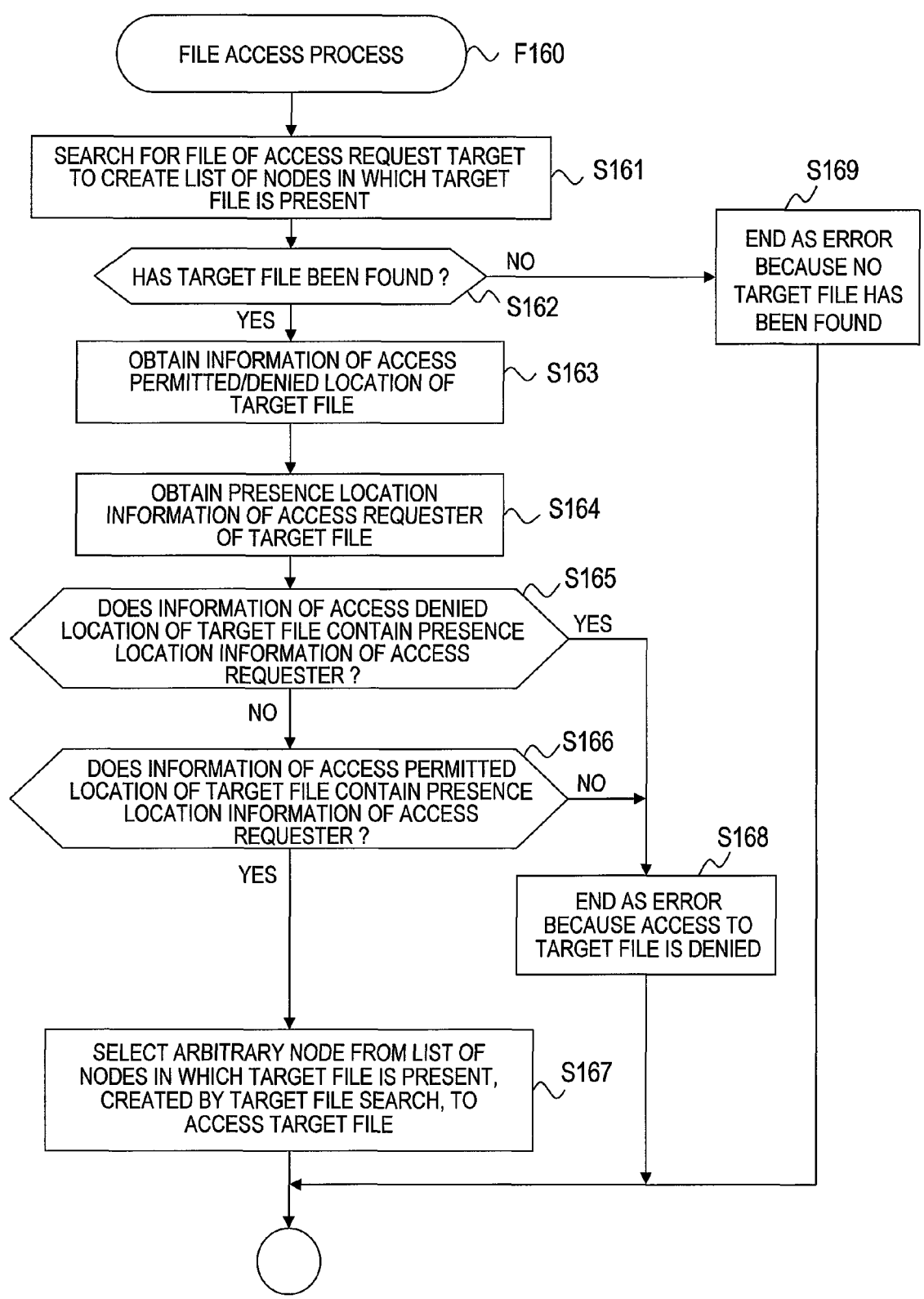
FIG. 12 is a flowchart showing a file access process in accordance with the first embodiment of this invention.

FIG. 12 is a flowchart of the file access process carried out by the file access subprogram 1134 according to the first embodiment of this invention.

The file access process is executed by a storage node (here, referred to as storage node A1100) which requests access when an access request of a shared file (hereinafter, referred to as target file) registered in the overlay network is received.

First, the file access subprogram 1134 searches for a target file of an access request to create a list of nodes in which the target file is present (S161). For the searching of the target file, the query request control subprogram 1126 selects a plurality of arbitrary storage nodes from the node management table 4000 to ask whether the target file is present in the plurality of selected storage nodes. For a method of selecting storage nodes, for example, a method of randomly selecting a plurality of storage nodes is available.

The query response control subprogram 1127 of the storage node (target node) selected in the step S161 receives a query request to check whether the target file is present, and transmits its result as a response to the storage node A1100. If the target file is present, the query response control subprogram 1127 of the target node transmits the response together with information of metadata of the target file to the storage node A1100.

The file access subprogram 1134 judges whether a target file has been found based on the response received from the target node in the step S161 (S162).

If a target file has not been found, the file access subprogram 1134 judges that a target file of an access request has not been found. In this case, the process proceeds to step S169.

On the other hand, if a target file has been found, the file access subprogram 1134 has to judge whether access can be requested to the target file. In this case, the process proceeds to step S163.

The file access subprogram 1134 obtains information of access permitted/denied location of the target file (S163). Specifically, the file access subprogram 1134 refers to the shared file metadata management table 4200 of the target file to obtain information of access permitted location 4230 and information of access denied location 4240.

The file access subprogram 1134 obtains information (presence location information) of a location (e.g., location where the client node 2000 is installed) where an access requester of the target file is present (S164).

A method of obtaining information of the location where the access requester is present is, for example, a method of using location information of a controller (e.g., storage node A1100) which has first received an access request from the access requester. Alternatively, a method in which the controller uses positional information obtained by a GPS as information of a presence location of the access requester may be used. Otherwise, a method in which a third party (e.g., authentication server 3000) authenticates a presence location at the time of an access request of the access requester, and an authentication result is used may be employed.

The file access subprogram 1134 judges whether the information of access denied location 4240 of the target file contains presence location information of the access requester (S165). Specifically, the file access subprogram 1134 refers to the information of access denied location 4240 stored as metadata of the target file in the shared file metadata management table 4200 to judge whether a location indicated by the information of access denied location 4240 contains presence location information of the access requester obtained in the step S164.

If the presence location information of the access requester is contained, the file access subprogram 1134 judges that access of the access requester to the target file is not permitted. In this case, the process proceeds to step S168.

On the other hand, if the presence location information of the access requester is not contained, the process proceeds to step S166.

The file access subprogram 1134 judges whether the information of access permitted location 4230 of the target file contains the presence location information of the access requester (S166). Specifically, the file access subprogram 1134 refers to information of access permitted location 4230 stored as metadata of the target file in the shared file metadata management table 4200 to judge whether a location indicated by the information of access permitted location 4230 contains the presence location information of the access requester obtained in the step S164.

If the presence location information of the access requester is not contained, the file access subprogram 1134 judges that access of the access requester to the target file is not permitted. In this case, the process proceeds to step S168.

On the other hand, if the presence location information of the access requester is contained, the file access subprogram 1134 judges that access of the access requester to the target file is permitted. In this case, the process proceeds to step S167.

The file access subprogram 1134 selects an arbitrary storage node from the list of nodes created in the step S161, and provides information of the selected storage node to the access requester. Then, the access requester accesses the storage node included in the provided information (S167).

For a method of selecting an arbitrary storage node, for example, a method of randomly selecting a storage node from the list of nodes created in the step S161 is available. Alternatively, a method of selecting a storage node closest to the access requester may be used. Otherwise, a method of selecting a storage node of shortest access time from the list of nodes may be used.

In step S168, as the file access subprogram 1134 judges that access to the target file is not permitted, the process is set as an error without permitting the access requester to access the target file (S168). In this case, the process is finished.

In step S169, as the file access program 1134 cannot find a target file, the process is finished as an error (S169).

The first embodiment of this invention has been described by way of the system for storing the shared file. However, the system may share and store, for example, data, information of a block unit, fixed length data, and a record in addition to the file.

According to the first embodiment of this invention, the storage node for storing the shared file can be designated for each shared file. Thus, by suppressing storage of the shared file in a storage node installed in a location not permitted to store the shared file, unnecessary communication can be removed, and wasteful storage use can be suppressed. Moreover, since a location for accessing the shared file can be designated for each shared file, access from a location where access is not permitted can be denied.

The first embodiment of this invention has been described by way of a configuration made by the storage node (controller). In addition, however, the embodiment can be configured as a control system or a control method. The first embodiment can be realized by various modes such as a computer program for realizing the storage node (controller), a recording medium for recording a program, and a data signal containing a program and realized in a carrier wave.

In the case of configuring the embodiment of this invention as a computer program or a recording medium for recording a program, it can be configured as a controller or an entire program for controlling the controller. Only modules which perform functions of the first embodiment may be provided. As a recording medium, for example, a flexible disk, a CD-ROM, a DVD-ROM, a punch card, a printed matter where codes such as barcodes have been printed, or various volatile or nonvolatile storage media readable by an internal or external storage system of a computer can be used.

Second Embodiment

According to the first embodiment, based on the system configuration shown in FIG. 1, the access to the shared file is controlled based on the storage destination node of the shared file and the presence location of the access requester. A second embodiment is directed to control for optimizing communication charges of a network. Description of modules of the second embodiment similar to those of the first embodiment will be omitted.

Figure 13:
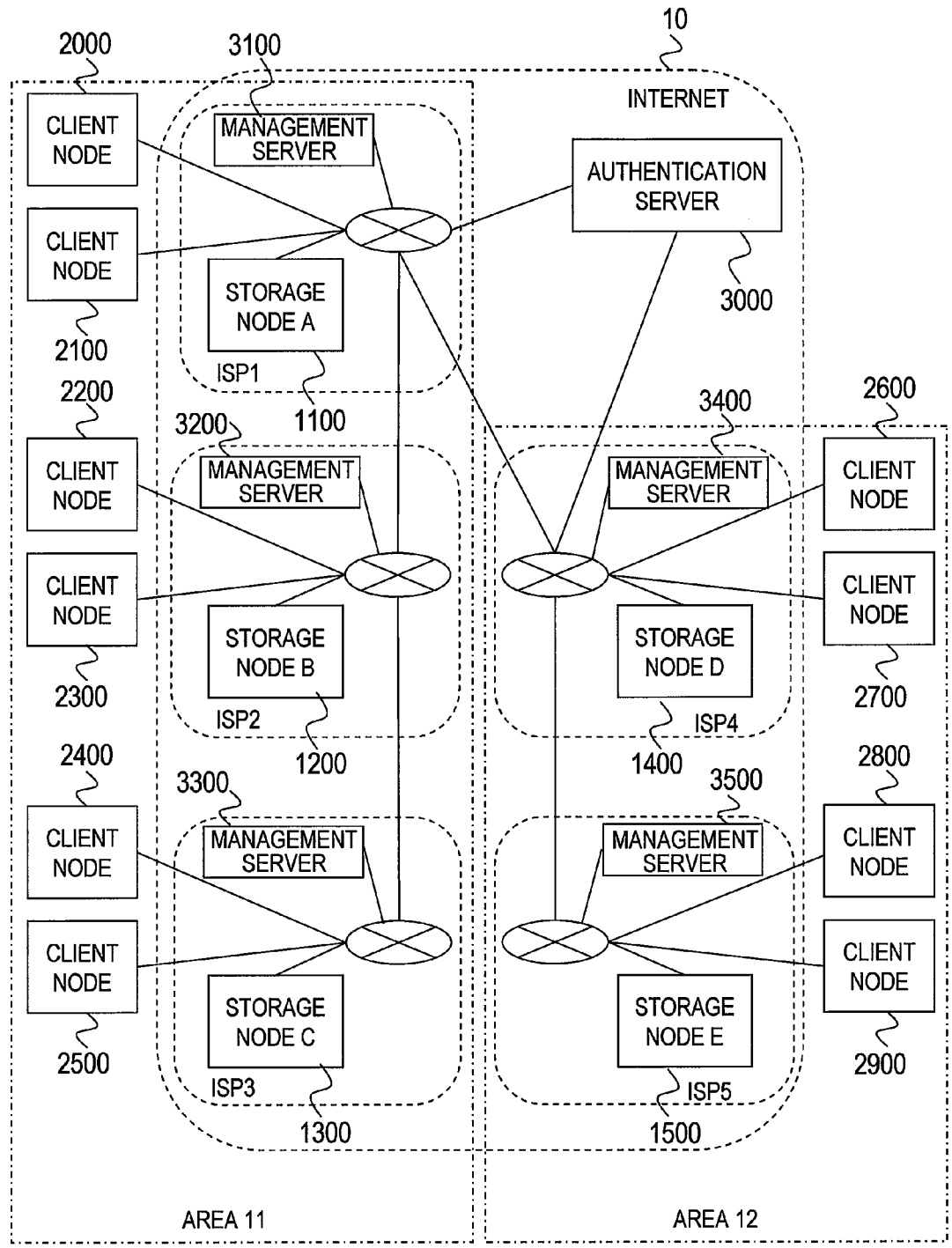
FIG. 13 is a configuration diagram showing a configuration of a computer system in accordance with a second embodiment of this invention.

FIG. 13 illustrates a configuration of a system according to the second embodiment of this invention.

A difference from the first embodiment is that management servers 3100, 3200, 3300, 3400, and 3500 are coupled to ISPs.

The management server 3100 provides information regarding network services provided by the ISP, and information regarding communication charges. The management servers 3200, 3300, 3400, and 3500 have similar configuration to the management server 3100. In the system shown in FIG. 13, one management server is coupled to one ISP. However, a plurality of management servers may be coupled.

Figure 14:
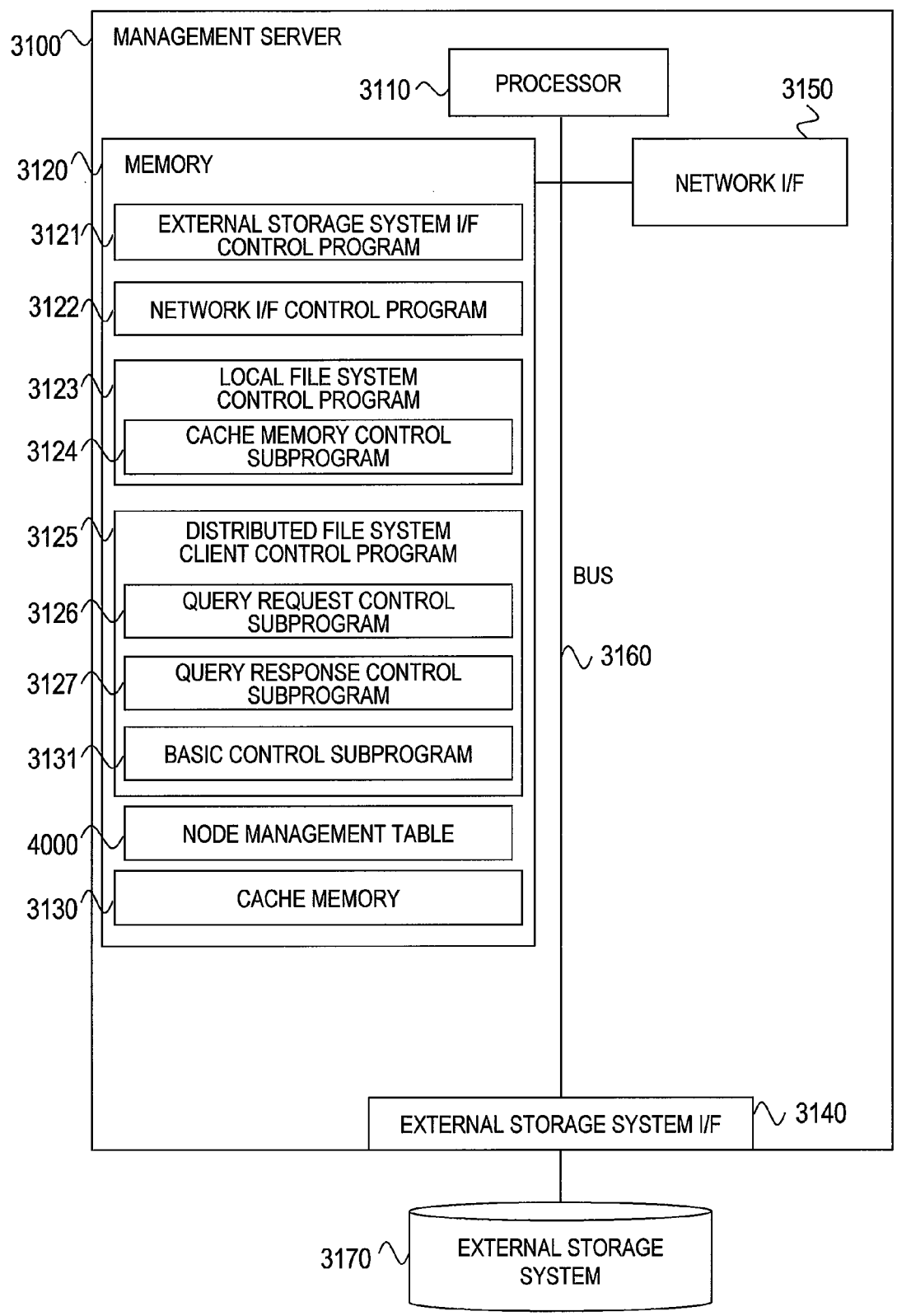
FIG. 14 is a block diagram showing a hardware configuration of the management server in accordance with the second embodiment of this invention.

FIG. 14 illustrates a hardware configuration of the management server 3100 according to the second embodiment of this invention.

The management server 3100 includes a processor 3110, a memory 3120, an external storage system I/F 3140, and a network I/F 3150. These components are intercoupled via a bus 3160. The management server 3100 is coupled to an external storage system 3170 via the external storage system I/F 3140.

The processor 3110 executes a program stored in the memory 3120 to control the entire management server 3100.

The memory 3120 temporarily stores the program executed by the processor 3110 and/or data. The memory 3120 may include, for example, a semiconductor memory such as a RAM.

The memory 3120 stores an external storage system I/F control program 3121, a network I/F control program 3122, a local file system control program 3123, a distributed file system management program 3125, an ISP information management table 4300, and a cache memory 3130.

The external storage system I/F control program 3121 controls the external storage system I/F 3140. The network I/F control program 3122 controls the network I/F 3150.

The local file system control program 3123 contains a cache memory control subprogram 3124. The local file system control program 3123 controls a file system provided by the management server 3100. The cache memory control subprogram 3124 controls the cache memory 3130.

The distributed file system management program 3125 contains a query request control subprogram 3126, a query response control subprogram 3127, a basic control subprogram 3131, and a file registration subprogram 3132.

The distributed file system management program 3125 manages information regarding network services provided by the ISP, and information regarding communication charges.

The query request control subprogram 3126 controls a query request transmitted to the other management server constituting the overlay network.

The query response control subprogram 3127 receives a query request from the other management server constituting the overlay network, executes a requested process, and controls a response of a processed result.

The basic control subprogram 3131 manages information of the management server 3100. For example, the basic control subprogram 3131 stores information (identification information) regarding the management server 3100 in the ISP information management table 4300.

The ISP information management table 4300 holds an ISP recognized by the management server 3100, identification information of a management server present in the recognized ISP, and information regarding communication charges of a network for reaching the recognized ISP. The ISP information management table 4300 will be described later in detail referring to FIG. 15.

The cache memory 3130 is used for shortening access response time when access to a file managed by the file system is made.

The external storage system I/F 3140 is an interface for accessing the external storage system 3170. The network I/F 3150 is an interface for accessing the other system coupled via the network.

The external storage system 3170 stores a program or user data. The external storage system 3170 may include, for example, a hard disk drive (HDD). Alternatively, a semiconductor memory device such as a flash memory may be used.

FIG. 15 illustrates a configuration of the ISP information management table 4300 according to the second embodiment of this invention.

The ISP information management table 4300 holds an ISP recognized by the management server 3100, identification information of a management server present in the recognized ISP, and information regarding communication charges of the network for reaching the recognized ISP.

The ISP information management table 4300 contains an ISP name 4310, management server identification information 4320 of the ISP, and communication charges 4330.

The ISP name 4310 is information for identifying the ISP in the network. In the management server identification information 4320 of the ISP shown in FIG. 15, information of a character string is stored. However, for example, information of a numerical value such as ID for identifying the ISP may be stored.

The management server identification information 4320 of the ISP is identification information of the management server of the ISP coupled to a normal network. The management server identification information 4320 of the ISP is used for designating an access destination when access is made to the management server via the network. In the management server identification information 4320 of the ISP shown in FIG. 15, an IP address is stored. However, for example, ID information for specifying the management server may be stored. Information of a character string may be stored.

The communication charges 4330 are communication charges from an ISP network to which the management server 3100 itself is coupled to a network of an ISP to which a management server of a communication target is coupled. For the communication charges 4330, the amount of money paid from one ISP to another is used. The amount of money to be paid by someone for facilities or operations may be used.

In an example shown in FIG. 15, five pieces of ISP information are stored. As an ISP name 4310, ISP management server identification information 4320, and communication charges 4330 of a first line of the ISP information management table 4300, "ISP 1", "10. 20. 30. 200", and "30" are respectively stored. These indicate that a management server named "ISP 1" is present in the network, the "ISP 1" can be accessed based on information of the destination "10. 20. 30. 200", and the amount of money indicated by the communication charges "30" has to be paid to access the "ISP 1".

Contents of the ISP information management table 4300 are updated by periodically exchanging information between the management servers. A method of updating the contents is similar to that of the flowchart of the node search process shown in FIG. 9. In other words, the contents are updated by making inquiries about the contents of the ISP information management table 4300 to the other management server.

FIG. 16 illustrates a configuration of the node management table 4000 according to the second embodiment of this invention.

A difference from the first embodiment is that the node management table 4000 contains node communication charges 4030.

The node communication charges 4030 are communication charges generated when communication with a target storage node is carried out. The node communication charges 4030 are updated by taking updating of the contents of the node management table 4000 as an opportunity. Information regarding the communication charges is obtained by making an inquiry to a management server corresponding to the management server identification information 4140 of the node installation location information management table 4100 described later referring to FIG. 17. A method of obtaining the information regarding the communication charges is similar to that of the flowchart of the node search process shown in FIG. 9. In other words, the information is obtained by making an inquiry about communication charges to the other management server.

In an example shown in FIG. 16, as a node name 4010, identification information 4020, and node communication charges 4030 of a first line of the node management table 4000, "STORAGE NODE A", "10. 20. 30. 40", and "30" are respectively stored. These indicate that a storage node named "STORAGE NODE A" participating in the overlay network is present, the "STORAGE NODE A" can be accessed based on information of the destination "10. 20. 30. 40", and the amount of money indicated by the communication charges "30" has to be paid to access the "STORAGE NODE A".

FIG. 17 illustrates a configuration of the node installation location information management table 4100 according to the second embodiment of this invention.

A difference from the first embodiment is that the node installation location information management table 4100 includes used ISP information 4130 and management server identification information 4140 of a used ISP.

The used ISP information 4130 is information for identifying an ISP which provides network services to which the storage node is coupled. When the storage node uses a plurality of ISPs, a plurality of pieces of information for identifying the ISPs are stored.

The management server identification information 4140 of the used ISP is identification information of a management server coupled to the ISP indicated by the used ISP information 4130 in the network.

The used ISP information 4130 and the management server identification information 4140 of the used ISP are similarly stored when the node installation location information 4110 is stored.

In an example shown in FIG. 17, as the used ISP information and the management server identification information 4140 of the used ISP of the node installation location information management table 4100, "ISP 2" and "10. 100. 30. 200" are respectively stored. These indicate that an ISP for providing network services to be used by the storage node has a name "ISP 2", and identification information of a management server belonging to the "ISP 2" is "10. 100. 30. 200".

Figure 18:
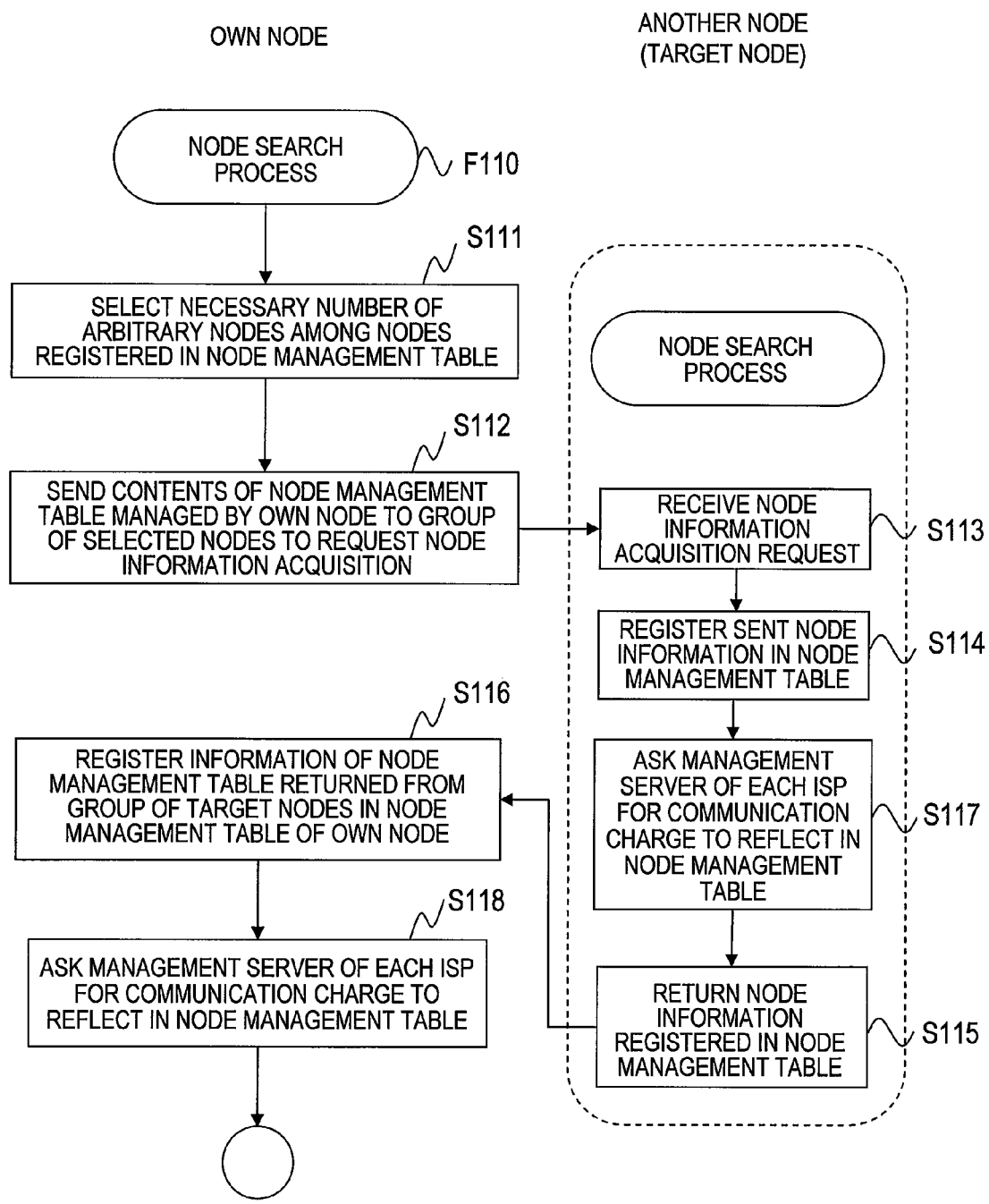
FIG. 18 is a flowchart showing a node search process in accordance with the second embodiment of this invention.

FIG. 18 is a flowchart showing a node search process according to the second embodiment of this invention.

A difference from the first embodiment is that step S117 is added between the steps 114 and 115 of FIG. 9, and step S118 is added after the step S116 of FIG. 9.

In the step S117, the query response control subprogram 1127 of the target node makes an inquiry about communication charges to a management server of each ISP to reflect the charges in the node management table 4000, based on the management server identification information 4140 of the node installation location information management table 4100 (S117).

If necessary information cannot be obtained only by the management server of an inquiry destination, the management server of the inquiry destination obtains information by sequentially asking the other management servers registered in the ISP information management table 4300 stored in its own server.

In the step S118, the query request control subprogram 1126 of the storage node A1100 makes an inquiry about communication charges to a management server of each ISP. The basic control subprogram 1131 of the storage node A1100 reflects the communication charges obtained from the management server of each ISP in the node management table 4000 (S118). Then, the process is finished.

Figure 19:
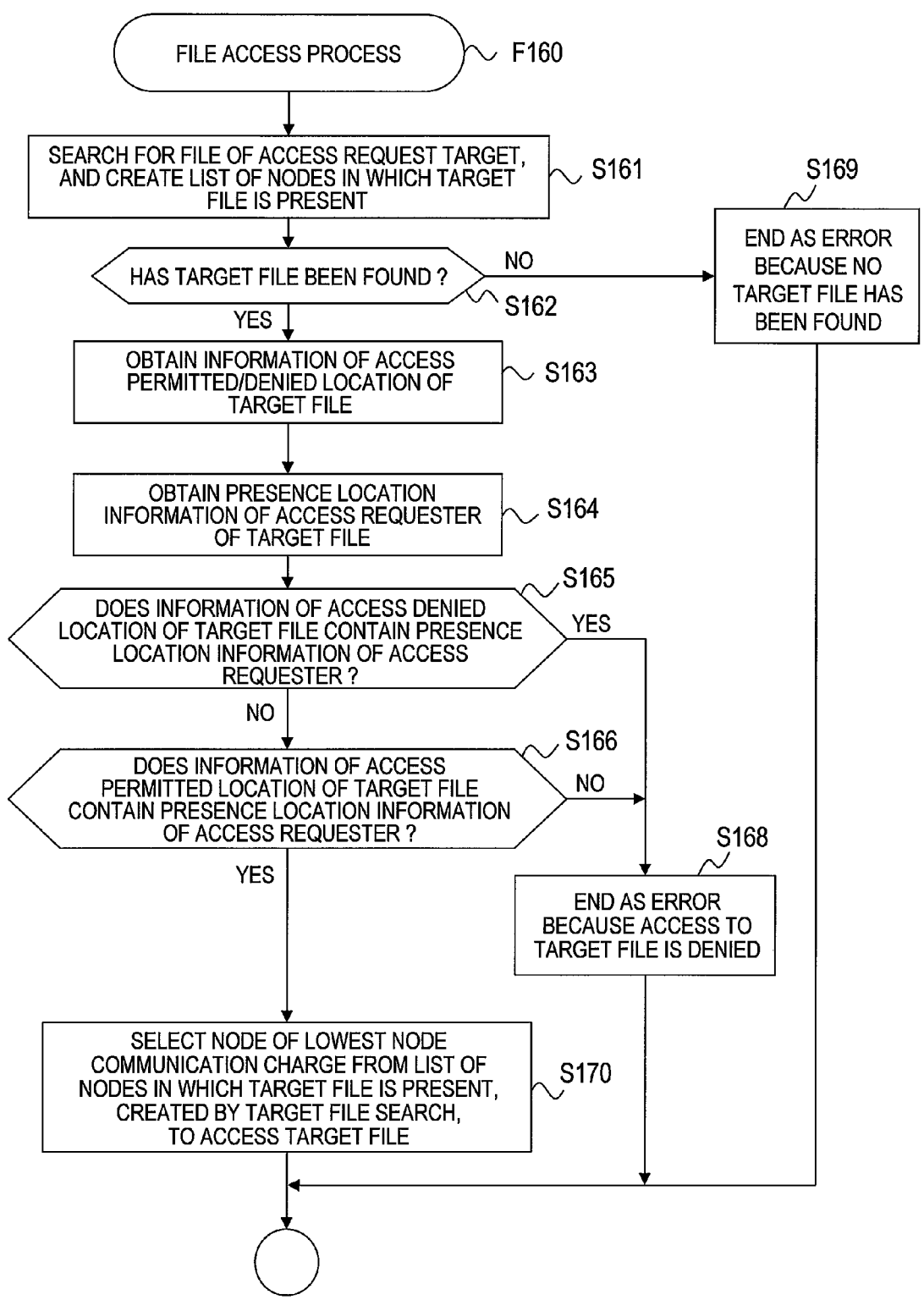
FIG. 19 is a flowchart showing a file access process in accordance with the second embodiment of this invention.

FIG. 19 is a flowchart showing a file access process according to the second embodiment of this invention.

A difference from the first embodiment is that step S170 is executed in location of the step S167 of FIG. 12.

In the step S170, the file access subprogram 1134 selects a node of lowest node communication charge from the list of nodes created in the step S161, and provides information of the selected storage node to an access requester. Then, the access requester accesses the storage node whose information has been provided (S170).

According to the first embodiment, the access destination of the target file is arbitrarily decided. According to the second embodiment, however, the storage node of low communication charges can be selected. Thus, by executing control to preferentially access a shared file of a storage node whose communication charge is lowest, communication charges for file share services can be reduced.

While the present invention has been described in detail and pictorially in the accompanying drawings, the present invention is not limited to such detail but covers various obvious modifications and equivalent arrangements, which fall within the purview of the appended claims.

What is claimed is:

1. A first controller of a plurality of controllers installed in a computer system, the computer system comprising the plurality of controllers, a plurality of data storage systems for storing copies of data in a distributed manner, and a network coupling the plurality of controllers, wherein each of the plurality of controllers controls access to the data stored in the plurality of data storage systems, the first controller comprising:

an interface coupled to the network;
a processor coupled to the interface; and
a storage unit coupled to the processor, wherein the storage unit stores attribute information indicating whether to permit access to the data,
wherein the attribute information includes information of storing permitted location and information of storing denied location,
wherein the information of storing permitted location designates an installation location of the first controller controlling a data storage system permitted to write the data, and the information of storing denied location designates an installation location of the first controller controlling a data storage system not permitted to write the data, and
wherein the processor is programmed to:
receive, from a client computer coupled to the network, a writing request to write the data;
determine whether the first controller is permitted to write the data based on the stored attribute information and information regarding a location of where the first controller is installed;
determine whether the information of storing denied location contains the location of where the first controller is installed;
when the information of storing denied location does contain the location of where the first controller is installed, write the data to a data storage system controlled by a second controller of the plurality of controllers,
wherein a determination has been made that the second controller is permitted to write the data based on attribute information of the second controller and information regarding a location of where the second controller is installed;
when the information of storing denied location does not contain the location where the first controller is installed, determine whether the information of storing permitted location contains the location of where the first controller is installed;
when the information of storing permitted location contains the location of where the first controller is installed, write the data to a data storage system controlled by the first controller;
when the information of storing permitted location does not contain the location of where the first controller is installed, write the data to the data storage system controlled by the second controller of the plurality of controllers,
wherein a determination has been made that the second controller is permitted to write the data based on the attribute information of the second controller and the information regarding a location of where the second controller is installed.

2. The first controller according to claim 1,
wherein the processor is further programmed to:
copy the data permitted to be written in the data storage system; and
store the copied data in the data storage system controlled by the controller determined to permit the writing.

3. The first controller according to claim 1, wherein the storage unit stores information of an installation location of the first controller.

4. The first controller according to claim 1, wherein the attribute information includes information of a location where a client computer permitted to access the data is installed, and information of a location where a client computer not permitted to access the data is installed.

5. The first controller according to claim 1, wherein the storage unit stores, for each piece of the data, information of an installation location of the first controller controlling a data storage system permitted to access the data, and information of a location where a client computer permitted to access the data is installed.

6. The first controller according to claim 1, wherein the processor is further programmed to:
receive a reading request of the data from the client computer coupled to the network;
obtain information of an installation location of the client computer which requests access to the data;
determine whether the first controller permits the requested reading of the data based on the held attribute information and the obtained information of the installation location of the client computer; and
read the data from a data storage system controlled by first controller determined as permitting the reading.

7. The first controller according to claim 6,
wherein the computer system further comprises an authentication computer coupled to the plurality of controllers via the network,
wherein the authentication computer authenticates a location where the client computer is installed, and
wherein the obtained information of the installation location of the client computer includes at least one of information of an installation location of a controller which has received an access request from the client computer without intermediation of any other controllers, information of the installation location of the client computer held by the client computer, and information of the installation location of the client computer authenticated by the authentication computer.

8. An access control method for data in a computer system, the computer system comprising a plurality of controllers, a plurality of data storage systems storing copies of the data in a distributed manner, and a network for coupling the plurality of controllers,
wherein each controller of the plurality of controllers comprises an interface coupled to the network, a processor coupled to the interface, and a storage unit coupled to the processor, and
wherein the storage unit stores attribute information indicating whether to permit access to the data,
wherein the attribute information includes information of storing permitted location and information of storing denied location,
wherein the information of storing permitted location designates an installation location of a controller controlling a data storage system permitted to write the data, and the information of storing denied location designates an installation location of a controller controlling a data storage system not permitted to write the data,
wherein the access control method comprises the steps of:
receiving, by a first controller of the plurality of controllers, a writing request to write the data from a client computer coupled to the network;
determining, by the first controller, whether the first controller is permitted to write the data based on the stored attribute information and information regarding a location of where the first controller is installed;
determining whether the information of storing denied location contains the location of where the first controller is installed;
when the information of storing denied location does contain the location of where the first controller is installed, writing the data to a data storage system controlled by a second controller of the plurality of controllers,
wherein a determination has been made that the second controller is permitted to write the data based on attribute information of the second controller and information regarding a location of where the second controller is installed;
when the information of storing denied location does not contain the location where the first controller is installed, determining whether the information of storing permitted location contains the location of where the first controller is installed;
when the information of storing permitted location contains the location of where the first controller is installed, writing the data to a data storage system controlled by the first controller;
when the information of storing permitted location does not contain the location of where the first controller is installed, writing the data to the data storage system controlled by the second controller of the plurality of controllers,
wherein a determination has been made that the second controller is permitted to write the data based on the attribute information of the second controller and the information regarding a location of where the second controller is installed.

9. The access control method according to claim 8, the method further comprising:
copying, by the controller, the data permitted to be written in the data storage system; and
storing, by the controller, the copied data in the data storage system controlled by the controller judged to permit the writing.

10. The access control method according to claim 8, wherein the storage unit stores information of an installation location of the controller.

11. The access control method according to claim 8, wherein the attribute information includes information of a location where a client computer permitted to access the data is installed, and information of a location where a client computer not permitted to access the data is installed.

12. The access control method according to claim 8, wherein the storage unit stores, for each piece of the data, information of an installation location of the first controller controlling a data storage system permitted to access the data, and information of a location where a client computer permitted to access the data is installed.

13. The access control method according to claim 8, further comprising the steps of:
receiving, by the first controller, a reading request of the data from the client computer coupled to the network;
obtaining, by the first controller, information of an installation location of a client computer which requests access to the data;
determining, by the first controller, whether the first controller permits the requested reading of the data based on the held attribute information and the obtained information of the installation location of the client computer; and
reading, by the first controller, the data from a data storage system controlled by first controller determined as permitting the reading.

14. The access control method according to claim 13,
wherein the computer system further comprises an authentication computer coupled to the plurality of controllers via the network,
wherein the access control method further comprises:
authenticating, by the authentication computer, a location where the client computer is installed, and
wherein the step of obtaining the information of the installation location of the client computer includes the step of obtaining, by the controller, at least one of information of an installation location of a controller which has received an access request from the client computer without intermediation of any other controllers, the information of the installation location of the client computer held by the client computer, and the information of the installation location of the client computer authenticated by the authentication computer.

15. A first storage node of a plurality of storage nodes, the first storage node controlling access to files stored in a plurality of storage subsystems, the plurality of subsystems storing copies of the files in a distributed manned, and providing the stored files to a client computer via a network, the first storage node comprising:
a first interface coupled to the network;
a second interface coupled to the plurality of storage subsystems;
a processor coupled to the first interface and the second interface; and
a memory coupled to the processor,
wherein the first storage node stores node management information including information regarding the first storage node, and attribute information indicating whether to permit access to the files,
wherein the attribute information includes information of storing permitted location and information of storing denied location,
wherein the information of storing permitted location designates an installation location of the first storage node controlling a storage subsystem permitted to write the data, and the information of storing denied location designates an installation location of the first storage node controlling a storage subsystem not permitted to write the data, and
wherein the processor executes a predetermined program comprising:
a query request control module for requesting, by a second storage node coupled via the network, the attribute information
a query response control module for receiving a request of the attribute information from the second storage node coupled via the network, obtaining the requested attribute information from the node management information, and transmitting the obtained attribute information to the second storage node which has requested the attribute information;
a basic control module for storing information regarding each storage node in the node management information;
a file registration module for receiving a writing request, from the client computer via the network, to write the file, determining whether to permit the received writing request based on the attribute information stored in the node management information and information regarding a location of where each storage node is installed, copying a file for which the writing request is permitted, and storing the copied file in a storage subsystem controlled by a storage node determined to permit the writing request,
wherein the information storing permitted location designates the installation location of the storage node determined to permit the writing request;
a file replication module for receiving a replication request of the file from the client computer via the network, determining whether to permit the received replication request based on attribute information of the file to be copied and the information of the location where the storage node is installed, copying the file for which the replication request is permitted, and storing the copied file in a storage subsystem controlled by a storage node determined to permit the replication request,
wherein the information storing permitted location designates the installation location of the storage node determined to permit the replication request; and
a file access module for receiving a reading request of the file from the client computer via the network, obtaining information of an installation location of a client reading request of the file based on the attribute information stored in the node management information and the obtained information of the client computer, and reading the file from a storage subsystem controlled by a storage node determined to permit the reading request,
wherein the information storing permitted location designates the installation location of the storage node determined to permit the reading request.

* * * * *